US011322043B2

(12) United States Patent
Lee et al.

(10) Patent No.: US 11,322,043 B2
(45) Date of Patent: *May 3, 2022

(54) REMOTE MULTIPLAYER INTERACTIVE PHYSICAL GAMING WITH MOBILE COMPUTING DEVICES

(71) Applicant: NEX Team Inc., San Jose, CA (US)

(72) Inventors: Keng Fai Lee, Cupertino, CA (US); Qi Zhang, Hong Kong (HK); Wing Hung Chan, Hong Kong (HK); Wang Fai Ng, Hong Kong (HK); Tin Yin Lam, Fremont, CA (US); Alexander Wu, San Francisco, CA (US); Ian Smith, Mountain View, CA (US); David Richard Schmierer, Campbell, CA (US); Bradford Lewis Farkas, New York City, NY (US); Kin Ming Law, Hong Kong (HK)

(73) Assignee: NEX Team Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,753

(22) Filed: Apr. 30, 2020

(65) Prior Publication Data

US 2020/0258419 A1 Aug. 13, 2020

Related U.S. Application Data

(63) Continuation of application No. 16/445,893, filed on Jun. 19, 2019, now Pat. No. 10,643,492.
(Continued)

(51) Int. Cl.
G09B 19/00 (2006.01)
A63B 24/00 (2006.01)
(Continued)

(52) U.S. Cl.
CPC ...... *G09B 19/0038* (2013.01); *A63B 24/0062* (2013.01); *A63B 71/0622* (2013.01);
(Continued)

(58) Field of Classification Search
CPC . A63B 24/00; A63B 24/0003; A63B 24/0006; A63B 24/0009; A63B 24/0012;
(Continued)

(56) References Cited

U.S. PATENT DOCUMENTS 5,857,855 A * 1/1999 Katayama .......... A63B 24/0062
434/247
5,886,788 A * 3/1999 Kobayashi ............... G03H 1/26
356/613

(Continued)

OTHER PUBLICATIONS

Krzysztof Przednowek, et al., "A System for Analysing the Basketball Free Throw Trajectory Based on Particle Swarm Optimization," Applied Sciences, 2018, vol. 8, Issue 11, p. 2090, MDPI, Basel, Switzerland.

(Continued)

Primary Examiner — Milap Shah
(74) Attorney, Agent, or Firm — American Patent Agency PC; Daniar Hussain; Stephen M. Hou

(57) ABSTRACT

Methods and systems for remote multiplayer gameplay are disclosed. An example method can include joining a multiplayer interactive physical game including first and second players competing in an activity; capturing a first game video of a first player in a first play of the multiplayer interactive physical game, using a first camera on a first mobile computing device in a first gaming area; determining a first object flow associated with the first player from the first game video, by performing an algorithm on one or more frames of the first game video to detect one or more key points of the first player; generating a first analytic based on the first object flow; receiving a second analytic associated (Continued)

with the second player in a second gaming area; and generating a feedback to the first player based on the first analytic or the second analytic.

18 Claims, 16 Drawing Sheets

Related U.S. Application Data

(60) Provisional application No. 62/687,393, filed on Jun. 20, 2018.

(51) Int. Cl.
  *G06K 9/00* (2006.01)
  *A63B 71/06* (2006.01)
  *A63B 69/00* (2006.01)
  *G09B 5/04* (2006.01)

(52) U.S. Cl.
  CPC ..... *G06K 9/00342* (2013.01); *G06K 9/00724* (2013.01); *G09B 5/04* (2013.01); *A63B 69/0071* (2013.01); *A63B 71/0669* (2013.01); *A63B 2071/0694* (2013.01); *A63B 2220/806* (2013.01); *G06K 2009/00738* (2013.01)

(58) Field of Classification Search
  CPC ........ A63B 24/0062; A63B 2024/0012; A63B 2220/806; A63B 2220/807; A63B 71/0622; A63B 71/0669; A63B 69/0071; A63B 2071/0694; G09B 19/0038; G09B 5/04; G06K 9/00342; G06K 9/00724; G06K 2009/00738
  See application file for complete search history.

(56) References Cited

U.S. PATENT DOCUMENTS

| | | | |
|---|---|---|---|
| 6,307,576 B1 | 10/2001 | Rosenfeld | |
| 6,503,086 B1* | 1/2003 | Golubov | A63B 24/0003 434/247 |
| 6,710,713 B1* | 3/2004 | Russo | A63B 24/0021 340/573.1 |
| 6,778,866 B1* | 8/2004 | Bettwy | A63B 24/0006 434/247 |
| 8,020,098 B2* | 9/2011 | Katayama | A63B 24/0021 715/720 |
| 8,314,840 B1* | 11/2012 | Funk | A61B 5/11 348/157 |
| 8,941,723 B2* | 1/2015 | Bentley | A63B 69/36 348/47 |
| 8,944,928 B2* | 2/2015 | Kaps | G06T 13/40 473/199 |
| 9,350,951 B1* | 5/2016 | Rowe | A63B 24/0003 |
| 9,886,624 B1 | 2/2018 | Marty et al. | |
| 10,010,778 B2 | 7/2018 | Marty et al. | |
| 10,643,492 B2* | 5/2020 | Lee | A63F 13/65 |
| 2005/0143154 A1 | 6/2005 | Bush | |
| 2005/0143183 A1* | 6/2005 | Shirai | A63B 69/3658 473/151 |
| 2005/0223799 A1* | 10/2005 | Murphy | A61B 5/1124 73/510 |
| 2006/0204045 A1* | 9/2006 | Antonucci | G06K 9/00342 382/107 |
| 2007/0026975 A1* | 2/2007 | Marty | A63B 24/0021 473/467 |
| 2007/0173355 A1* | 7/2007 | Klein | A63B 24/0021 473/447 |
| 2008/0146302 A1* | 6/2008 | Olsen | A63F 13/211 463/7 |
| 2008/0146339 A1* | 6/2008 | Olsen | A63F 13/213 463/42 |
| 2008/0312010 A1* | 12/2008 | Marty | A63B 69/00 473/447 |
| 2010/0145232 A1* | 6/2010 | Jang | A63B 24/0006 600/587 |
| 2011/0013087 A1* | 1/2011 | House | H04N 5/2624 348/564 |
| 2012/0296454 A1* | 11/2012 | Lui | A63B 71/06 700/91 |
| 2013/0095960 A9* | 4/2013 | Marty | A63B 63/083 473/447 |
| 2013/0095961 A1* | 4/2013 | Marty | A63B 24/0003 473/450 |
| 2014/0180449 A1* | 6/2014 | Sung | A63B 24/0006 700/91 |
| 2014/0180451 A1* | 6/2014 | Marty | G06K 9/00342 700/91 |
| 2014/0200692 A1* | 7/2014 | Thurman | A63B 69/0071 700/91 |
| 2014/0222177 A1* | 8/2014 | Thurman | A63B 60/46 700/92 |
| 2015/0057775 A1* | 2/2015 | Dong | A63B 69/0071 700/91 |
| 2015/0139502 A1* | 5/2015 | Holohan | G06T 7/75 382/107 |
| 2016/0279498 A1* | 9/2016 | Gordon | A63B 71/0619 |
| 2017/0072283 A1* | 3/2017 | Davisson | A63B 43/00 |
| 2017/0128814 A1* | 5/2017 | Lanni | G06Q 10/0639 |
| 2017/0132470 A1* | 5/2017 | Sasaki | G06K 9/00885 |
| 2017/0154222 A1* | 6/2017 | Zakaluk | H04N 21/8133 |
| 2017/0209795 A1* | 7/2017 | Harvey | A63F 13/825 |
| 2018/0056124 A1* | 3/2018 | Marty | G06T 7/20 |
| 2018/0189971 A1* | 7/2018 | Hildreth | A63B 43/004 |
| 2018/0218243 A1 | 8/2018 | Felsen et al. | |
| 2019/0087661 A1* | 3/2019 | Lee | G06Q 50/00 |
| 2019/0366153 A1* | 12/2019 | Zhang | A63B 24/0062 |

OTHER PUBLICATIONS

Simone Francia, "SpaceJam: a Dataset for Basketball Action Recognition," Github Code Repository Page, available at: https://github.com/simonefrancia/SpaceJam, last access: Apr. 2, 2019.

Techsmith Corporation, "Coach's Eye," Coach's Eye website, available at: https://www.coachseye.com/, last accessed: Feb. 18, 2019.

Stats LLC, "Stats SportVU Basketball Player Tracking," SportVU website, available at: https://www.stats.com/sportvu-basketball/, last accessed: Feb. 12, 2019.

Vignesh Ramanathan, et al., "Detecting events and key actors in multi-person videos," The IEEE Conference on Computer Vision and Pattern Recognition (CVPR), 2016, pp. 3043-3053.

Mark Sandler, et al., "MobileNetV2: Inverted Residuals and Linear Bottlenecks," The IEEE Conference on Computer Vision and Pattern Recognition (CVPR), 2018, pp. 4510-4520, available at: https://arxiv.org/abs/1801.04381, last accessed: May 7, 2019.

Wei Liu, et al., "SSD: Single Shot MultiBox Detector," European conference on computer vision, pp. 21-37, Springer, Cham, 2016, available at: https://arxiv.org/abs/1512.02325, last accessed: May 7, 2019.

Zhe Cao, et al., "Realtime Multi-Person 2D Pose Estimation using Part Affinity Fields," Proceedings of the IEEE Conference on Computer Vision and Pattern Recognition, pp. 7291-7299, 2017, available at: https://arxiv.org/abs/1611.08050, last accessed: May 7, 2019.

Andrew G. Howard, et al., "MobileNets: Efficient Convolutional Neural Networks for Mobile Vision Applications," arXiv preprint arXiv:1704.04861, 2017, available at: https://arxiv.org/abs/1704.04861, last accessed: May 7, 2019.

Raine Kajastila, et al., "Motion Games In Real Sports Environments," XXII.2 March + Apr. 2015, Available at https://interactions.acm.org/archive/view/march-april-2015/motion-games-in-real-sports-environments, last accessed May 21, 2019.

Raine Kajastila, et al., "Empowering the Exercise: a Body-Controlled Trampoline Training Game," International Journal of Computer Science in Sport—vol. 13/2014/Edition 1, Available at: www.iacss.org.

(56) References Cited

OTHER PUBLICATIONS

Raine Kajastila, et al., "Augmented Climbing: Interacting With Projected Graphics on a Climbing Wall," CHI 2014, Apr. 26-May 1, 2014, Toronto, ON, Canada, ACM 978-1-4503-2474-8/14/04. Available at: http://dx.doi.org/10.1145/2559206.2581139, last accessed May 22, 2019.

Perttu Hamalainen, Tommi Llmonen, et al., "Martial Arts in Artificial Reality," CHI 2005 Papers: Enhancing Virtual Spaces and Large Displays, April 2-7, Portland Oregon, US.

Rainer Planinc, et al., "Exergame Design Guidelines for Enhancing Elderly's Physical and Social Activities," Ambient 2013 : The Third International Conference on Ambient Computing, Applications, Services and Technologies, Available at: https://pdfs.semanticscholar.org/80d7/ddb6d443ef693fd59e12b5413a2a142ef6da.pdf.

Kazumoto Tanaka et al., "A Comparison of Exergaming Interfaces for Use in Rehabilitation Programs and Research," The Journal of the Canadian Game Studies Association, vol. 6(9): 69-81, 2012, Available at: http://loading.gamestudies.ca.

Andy Butler, et al.,"Nike 'House of Mamba' LED Basketball Court by AKQA", Aug. 16, 2014, Available at: https://www.designboom.com/design/nike-house-of-mamba-led-basketball-court-08-16-2014/, last accessed Jun. 18, 2019.

\* cited by examiner

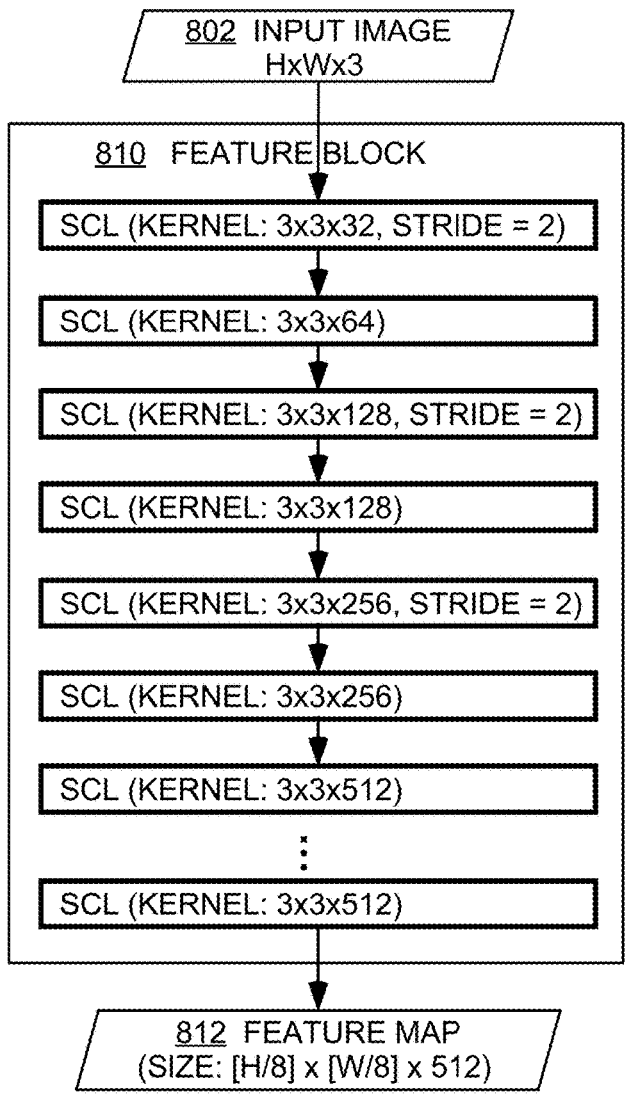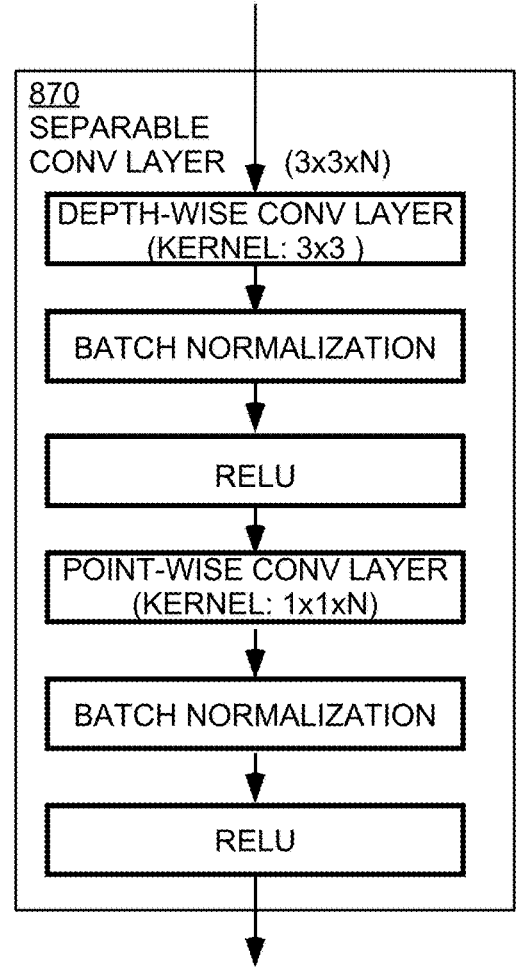
FIG. 8B
FIG. 8C

1100

1110 START

↓

1120 CAPTURE A 1ST GAME VIDEO OF A 1ST PLAYER IN A 1ST PLAY OF A PHYSICAL GAME, USING A 1ST CAMERA ON A 1ST MOBILE COMPUTING DEVICE IN A 1ST GAMING AREA ASSOCIATED WITH THE 1ST PLAYER

↓

1130 EXTRACT A 1ST POSTURE FLOW OF THE 1ST PLAYER FROM THE 1ST GAME VIDEO, BY PERFORMING A COMPUTER VISION ALGORITHM ON ONE OR MORE FRAMES OF THE 1ST GAME VIDEO

↓

1140 GENERATE A 1ST PLAYER ANALYTIC BASED ON THE 1ST POSTURE FLOW

↓

1150 RECEIVE A 2ND PLAYER ANLAYTIC GENERATED BASED ON A 2ND POSTURE FLOW OF A 2ND PLAYER, WHERE THE 2ND POSTURE FLOW WAS EXTRACTED FROM A 2ND GAME VIDEO OF THE 2ND PLAYER IN A 2ND PLAY OF THE PHYSICAL GAME, CAPTURED BY A 2ND CAMERA IN A 2ND GAMING AREA ASSOCIATED WITH THE 2ND PLAYER

↓

1160 GENERATE A FEEDBACK TO THE 1ST PLAYER, BASED ON AT LEAST ONE OF THE 1ST PLAYER ANALYTIC AND THE 2ND PLAYER ANALYTIC

↓

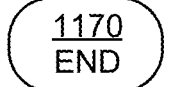

1170 END

REMOTE MULTIPLAYER INTERACTIVE PHYSICAL GAMING WITH MOBILE COMPUTING DEVICES

REFERENCE TO RELATED APPLICATIONS

This application is a continuation of U.S. Ser. No. 16/445,893, filed on Jun. 19, 2019, entitled "REMOTE MULTIPLAYER INTERACTIVE PHYSICAL GAMING WITH MOBILE COMPUTING DEVICES," which itself is a non-provisional of and claims priority to provisional U.S. Ser. No. 62/687,393, filed on Jun. 20, 2018, entitled "Remote Real-Time Multiplayer Gameplay with a Mobile Device Utilizing Computer Vision and Artificial Intelligence," the entire disclosures of all of which are hereby incorporated by reference in their entireties herein.

This application is related to U.S. Ser. No. 16/109,923, filed on 23 Aug. 2018, entitled "Methods and Systems for Ball Game Analytics with a Mobile Device" and is also related to U.S. Ser. No. 16/424,287, filed on 28 May 2019, entitled "Methods and Systems for Generating Sports Analytics with a Mobile Device" the entire disclosures of all of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of sports and games, and pertain particularly to methods and systems for enabling distributed multiplayer games with one or more mobile computing devices having cameras for video capture.

BACKGROUND OF THE INVENTION

The statements in this section may serve as a background to help understand the invention and its application and uses, but may not constitute prior art.

Advances in modern computing technology have enabled active video games, exergames, or interactive fitness games that combine physical activities with video games to promote fitness and healthy living, by relying on real-time motion tracking techniques and virtual reality capabilities. Yet, no existing system allows networked play of physical games using general purpose mobile computing devices. Some gyms, health clubs, recreational centers, and schools incorporate exergames into their facilities using specialized equipment. For example, interactive wall-climbing games, active floor and wall games, and dance and step games have become popular in recent years, but each require pre-installed sensing and display devices such as interactive walls and floors with embedded sensors, and large projector screens. For home gaming systems, dedicated gaming consoles, handheld remote controllers, motion sensing controllers, and other accessories such as arm straps, headsets, balance boards, and dance mats are often needed. Examples of home systems include Nintendo Wii, Xbox Kinect, and PlayStation VR.

Mobile games have proliferated over the past decade, with lessened dependence on specialized, stationary hardware, and some mobile games such as Pokemon Go can incorporate physical locations to encourage physical movements of the player in an augmented reality setting, but such games are still played mostly on-screen. The limited computational resources in a mobile device present a unique challenge in the real-time capture and analysis of game actions. For instance, a smartphone's limited CPU processing power is heat-sensitive. CPU clock rate is reduced by the operating system (OS) whenever the phone heats up. Also, when a system consumes too much memory, the system or application running on the system may be terminated by the OS. Currently no existing gaming platforms or applications can facilitate the interactive play of physical games or activities with mobile computing devices alone.

Therefore, in view of the aforementioned difficulties, there is an unsolved need to design a mobile platform that enables interactive physical gaming, without the need for dedicated sensors, controls, consoles, displays, or similar gaming accessories. It would also be an advancement in the state of the art to enable remote, multiplayer, real-time play of interactive physical games and activities with mobile devices.

It is against this background that various embodiments of the present invention were developed.

BRIEF SUMMARY OF THE INVENTION

Some embodiments of the present invention include methods, systems, and apparatuses for enabling multiplayer interactive physical games with one or more mobile devices, where the players may be located at geographically different gaming areas.

In various aspects, a method for multiplayer interactive physical gaming with at least two mobile computing devices is described. The method can include the steps of joining a multiplayer interactive physical game including at least a first player and a second player, where the first player and the second player participate in an activity; capturing a first game video of the first player in a first play of the multiplayer interactive physical game, using a first camera on a first mobile computing device in a first gaming area; determining a first object flow associated with the first player from the first game video, by performing an algorithm on one or more frames of the first game video to detect one or more key points of the first player; generating a first analytic based on the first object flow; receiving a second analytic associated with the second player in a second gaming area; and generating a feedback to the first player based on at least one of the first analytic and the second analytic.

In some embodiments, the second mobile computing device can be in a second gaming area that can be geographically different from the first gaming area. In some embodiments, the first play and the second play of the multiplayer interactive physical game can be asynchronous in time. In other embodiments, the method can further include receiving a user input from the first player to initiate the multiplayer interactive physical game, where the user input can be selected from the group consisting of a voice input and a gesture input to the first mobile computing device.

In some examples, the determining the first object flow can further include performing the algorithm on the one or more frames of the first game video to determine an affinity field map, and determining a pose of the first player based on the key points and the affinity field map. In other embodiments, the method can further include detecting a scoring attempt from the first game video of the multiplayer interactive physical game, and the generating of the first analytic can be based on an outcome of the scoring attempt. In some embodiments, the method can further include providing the feedback to the first player using at least one of an audio output and a video output associated with the first mobile computing device. In other embodiments, the generating of the feedback can be live during the first play or second play of the multiplayer interactive physical game. In some embodiments, the feedback to the first player can include instructions for actions to be performed by the first player. In other embodiments, the method can further include determining a location of a portion of a body of the first player in the first gaming area from the first game video, and the generating of the feedback can be further based on the location.

In some aspects, a system for remote multiplayer interactive physical gaming with mobile computing devices is described. The system can include at least one processor on a mobile computing device, and a non-transitory physical medium for storing program code accessible by the at least one processor. Further, the program code when executed by the processor can cause the processor to join a multiplayer interactive physical game including at least a first player and a second player, where the first player and the second player participate in an activity; capture a first game video of the first player in a first play of the multiplayer interactive physical game, using a first camera on a first mobile computing device in a first gaming area; determine a first object flow associated with the first player from the first game video, by performing an algorithm on one or more frames of the first game video to detect one or more key points of the first player; generate a first analytic based on the first object flow; receive a second analytic associated with the second player in a second gaming area; and generate a feedback to the first player based on at least one of the first analytic and the second analytic.

In some embodiments, the second mobile computing device can be in a second gaming area that can be geographically different from the first gaming area. In other embodiments, the first play and the second play of the multiplayer interactive physical game can be asynchronous in time. In some embodiments, the program code when executed by the processor further causes the processor to receive a user input from the first player to initiate the multiplayer interactive physical game, where the user input can be selected from the group consisting of a voice input and a gesture input to the first mobile computing device. In some examples, the program code when executed by the processor to determine the first object flow further includes program code that causes the processor to perform the algorithm on the one or more frames of the first game video to determine an affinity field map, and to determine a pose of the first player based on the key points and the affinity field map.

In other embodiments, the program code when executed by the processor further causes the processor to detect a scoring attempt from the first game video of the multiplayer interactive physical game, and the program code that causes the processor to generate the first analytic can be based on an outcome of the scoring attempt. In some embodiments, the program code when executed by the processor further causes the processor to provide the feedback to the first player using at least one of an audio output and a video output associated with the first mobile computing device. In other embodiments, the feedback can be live during the first play or second play of the multiplayer interactive physical game. In some embodiments, the feedback to the first player includes instructions for actions to be performed by the first player.

In various aspects, a non-transitory physical storage medium for remote multiplayer interactive physical gaming with mobile computing devices is described. The storage medium can include program code stored thereon, and the program code when executed by a processor can cause the processor to join a multiplayer interactive physical game including at least a first player and a second player, where the first player and the second player participate in an activity; capture a first game video of the first player in a first play of the multiplayer interactive physical game, using a first camera on a first mobile computing device in a first gaming area; determine a first object flow associated with the first player from the first game video, by performing an algorithm on one or more frames of the first game video to detect one or more key points of the first player; generate a first analytic based on the first object flow; receive a second analytic associated with the second player in a second gaming area; and generate a feedback to the first player based on at least one of the first analytic and the second analytic.

Yet other aspects of the present invention include methods, processes, and algorithms comprising the steps described herein, and also include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 8B is a detailed block diagram illustrating an exemplary Feature Block, according to exemplary embodiments of the present invention;

FIG. 8C is a detailed block diagram illustrating an exemplary separable convolutional neural network layer, according to exemplary embodiments of the present invention;

FIG. 11 shows a flowchart illustrating exemplary operations at a user device for a remote multiplayer interactive physical game, according to exemplary embodiments of the present invention.

FIGS. 12A and 12B show respective instruction and leaderboard screenshots of an illustrative interactive shooting game, according to exemplary embodiments of the present invention.

DETAILED DESCRIPTION OF THE INVENTION

Figure 1A:
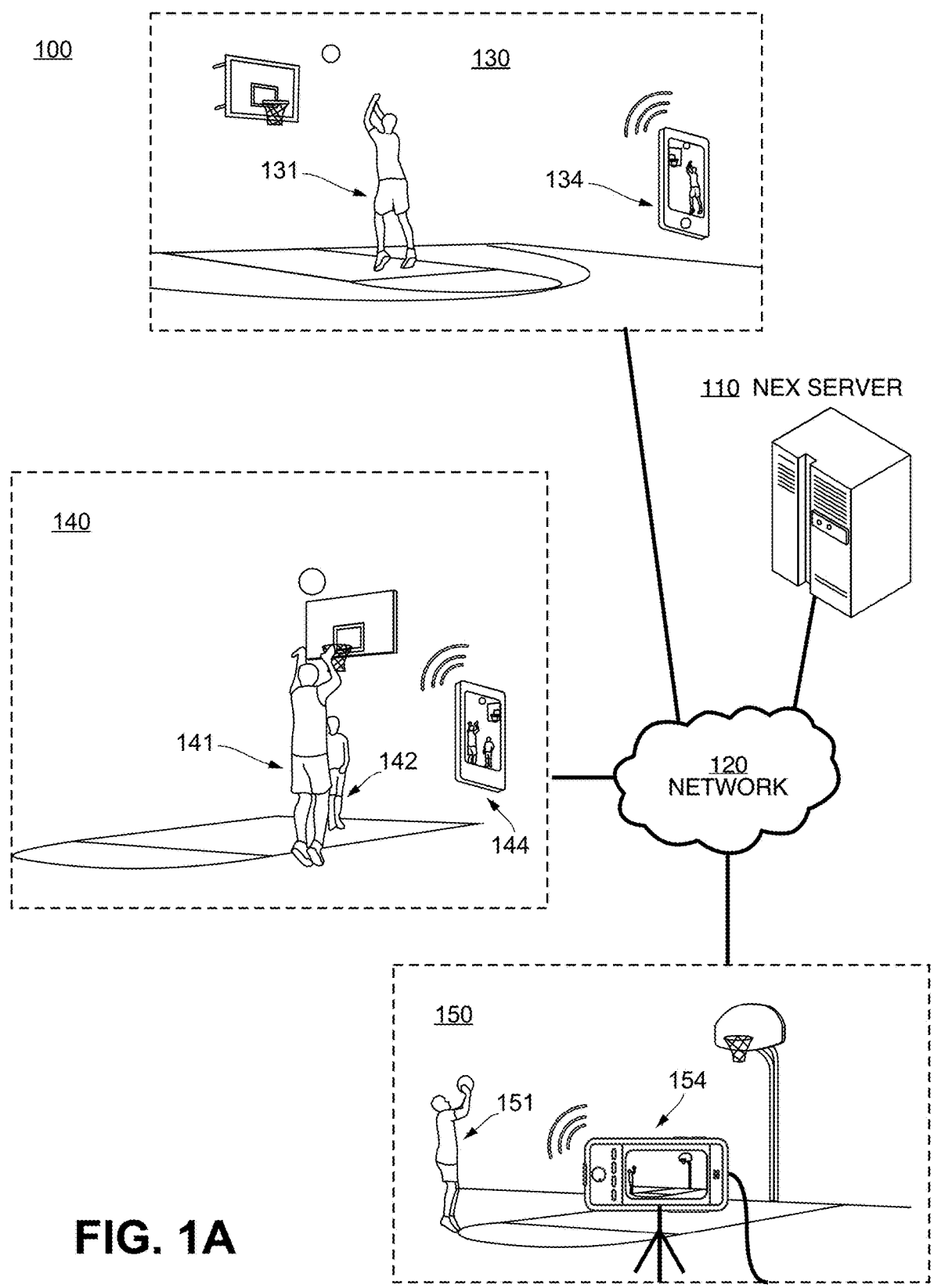
FIG. 1A is a diagram illustrating a remote multiplayer interactive physical game with mobile computing devices utilizing computer vision and artificial intelligence, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game platform, as well as the company providing said platform. With reference to the figures, embodiments of the present invention are now described in detail.
Overview Broadly, embodiments of the present invention relate to enabling the interactive play of physical games using mobile devices such as smartphones and tablets, and pertain particularly to methods and systems for monitoring, reporting, and facilitating the remote interactive play of multiplayer physical games using mobile devices having on-device cameras, by deploying artificial-intelligence (AI)-based computer vision techniques.

It would be understood by persons of ordinary skill in the art that the term "physical game" in this disclosure broadly refer to any structured, real-world physical activity played with certain goals and challenges, optionally scored according to certain rules. A physical game differs from a video game as it is not played exclusively on-screen. Instead, a physical game may comprise any physical activity or sports, such as any court, field, or trail game. Examples include, but are not limited to, ball games such as soccer, baseball, football, and hockey; wall and floor activities such as wall climbing, gymnastics, dancing, yoga, and pilates; any combination of simple exercises such as pushups, sit-ups, and planks; and water sports such as diving and water polo. A physical game may be a competitive activity involving individual players or opposing teams, or individual and group practice drilling activities. In addition, a "play" or "game play" of a physical game refers to an instance of the game conducted by one or more players at a given gaming area. In this disclosure, when players participating in a single game are located at geographically different gaming areas, the actions at each separate gaming location are considered separate plays.

A key feature of the present invention is the novel design of mobile AI-based computer vision techniques, to generate player analytics and to facilitate interactive play of physical games. Unlike existing computer vision-based physical games that require dedicated sensor equipment such as high-resolution cameras mounted on top of a ball court or sensing bars mounted on top of a TV, embodiments of the present invention allow users to perform real-time monitoring, analysis and interactive control of a physical game with a mobile device by utilizing simple on-device cameras and general purpose processors. More specifically, embodiments of the present invention provide game instruction, compliance detection, scoring, refereeing, and feedback to one or more users playing a physical game, through the use of computer vision and artificial intelligence running on a mobile computing device such as a smartphone, a tablet, or a laptop. Innovative and efficient object detection and posture tracking techniques thus deployed enable the analysis of game images and/or videos captured by the on-device camera to determine user or player analytics such as movement patterns, body postures, and whether attempts at particular game challenges has been successful. For example, for the game of basketball, the analysis and recording of user actions may include, but not limited to: detecting a shot attempt, recording how the attempt was made and the result of the attempt, identifying a shooting location, and identifying players involved in the shot attempt. As another example, in an interactive slam dunk contest, embodiments of the present invention may provide audio instructions to a player to start a dunk attempt, capture a game video of the dunk attempt, then analyze the position of the ball to determine whether the dunk has been successful, and analyze a posture flow of the player leading up to the dunk to determine other player analytics such as back bend angle, jump height, and shot or dunk type. A quality score may be further computed and provided as a player analytic, based on player posture and existing player analytics, including player movement sequences and dunk attempt results.

The generation of player analytics require the analysis of game video recordings to determine the movement pattern and postures of players and optionally other objects present in the gaming area. In various embodiments, computer vision techniques such as image registration, motion detection, background subtraction, objection tracking, 3D-reconstruction techniques, cluster analysis techniques, camera calibration techniques such as camera pose estimation and sensor fusion, and modern machine learning techniques such as convolutional neural network (CNN), may be selectively combined to perform high accuracy analysis in real-time on the mobile device.

The interactivity as disclosed herein stems from real-time game action analysis and feedback generation as provided by embodiments of the present invention, where feedback to a player may include game instructions, game scores, current player analytics for one or more players, and the like. For example, a game instruction for a basketball shot contest may be "make a 3-pointer," or "make a Tomahawk dunk." A feedback message to a player may be "shot success, total score is 35 points for Team A." A feedback message may also be a game instruction for a new round of the game. Such feedback messages may be displayed on a user interface such as a touchscreen. As a physical game is not rooted in the virtual world, some embodiments of the present invention do not require users to interact with an on-device screen or similar user interfaces of the mobile device to conduct all or most aspects of the game. Instead, instructions and feedback to the player may be communicated through audio broadcast and/or visual projections, and user input may be collected via speech recognition or posture recognition.

Another key feature of the present invention is its ability to facilitate remote multiplayer games, where users at geographically different gaming areas can participate in physical games or engage in activities against one another using one or more network-connected mobile devices. Each mobile device may be mounted on a tripod placed in a separate gaming area, to capture game actions of one or more players in the gaming area. Analytics for a given player, shot, or team may be communicated to other mobile devices, with or without passing through a central game server, for generating further player feedbacks such as scores or game instructions. For example, when multiple players participate in a remote slam dunk contest, a quality score for a dunk by one player may be broadcasted to other players, for each mobile device to determine whether it should proceed into a next round of the game. In some embodiments, a central game server may collect player analytics for each participating player to determine whether the game has been won by a particular player.

Remote Multiplayer Interactive Physical Gaming

FIG. 1A is a diagram 100 illustrating a remote multiplayer interactive physical game with mobile computing devices, according to one embodiment of the present invention. Game actions in three geographically different gaming areas 130, 140 and 150 are captured by mobile devices 134, 144, and 154, respectively, through NEX systems implemented therein. In this illustrative example, each gaming area is a basketball court with court lines and at least one basket on a backboard, and the interactive physical game is a three-point basketball contest where each participant attempts to make as many three-point field goals as possible within a given time period such as five minutes. Although this illustrative example has been described with reference to basketball, one of ordinary skill in the art would recognize that the methods and systems taught in the present disclosure may be applied to other physical games, including but not limited to baseball, golf, soccer, dancing, diving, and so forth.

A single player 131 is present in game area 130, two players 141 and 142 are present in game area 140, and another single player 151 is present in game area 150. Players 141 and 142 may take turns participating in the game. In some embodiments, the NEX system may automatically distinguish the two players based on visual features such as jersey colors or facial or body features. In some embodiments, player identities may be provided by players themselves to mobile device 144, for example, through voice command or posture control. In this disclosure, the terms "user" and "player" are used interchangeably, assuming that a user of a mobile user computing device shown in FIG. 1 is a player participating in an interactive physical game facilitated by the NEX system implemented on the user device.

As shown in FIG. 1A, mobile device 134 faces the basketball hoop directly, and is positioned approximately within the center circle, along the mid court line. Mobile device 144 is positioned along a sideline. Mobile device 154, on the other hand, is positioned within a wing area. Mobile devices 134 and 144 may be handheld by another person present in the gaming area, propped on a surface, or mounted on a tripod, like mobile device 154. In different embodiments of the present invention, each participating mobile device may be mounted at any location around the game area, for capturing game actions from various angles and distances.

A gaming area or game area may be any designated space for playing a physical game, indoor or outdoor, with or without markings, with or without equipment, and under varying lighting conditions. Exemplary gaming areas include, but are not limited to, basketball courts, baseball fields, soccer fields, dance floors, gymnasium, balance beams, trampolines, weight benches, swimming pools, diving platforms, living room floors, and baby playmats. In some embodiments, the NEX system may detect and analyze typical gaming areas with minimal or no user input, by automatically detecting gaming area identifiers such as court lines, and equipment such as goals and baskets. In some embodiments, user input may be received on the mobile device to indicate a type and range of the gaming area. For example, the NEX system may provide an option for a player to identify the center of a free throw line by tapping on a captured image of the gaming area, or to verify an automatically determined location manually and adjust if necessary. In some embodiments, image stabilization and similar technique may be deployed for robustness against vibration or accidental movements of the mobile device.

Game videos of individual players or teams in each gaming area as captured by mobile devices shown in FIG. 1A may be analyzed using AI-based computer vision algorithms to extract object flows, including ball trajectories and player postures flows. Subsequently, object flows maybe analyzed to generate individual player analytics. For example, a basketball flow may be compared to a detected hoop to determine whether a shot attempt has been made, and whether the shot attempt has been successful. Such a shot analytic may also be a player analytic if the basketball flow can be assigned to a known or detected player based on distance measures. In another example, a posture flow of a springboard diver making a required dive may be analyzed to determine how many rotations and revolutions the diver has made, an angle of entry into water, the diver's height, distance from the board, rotation speed, and a score may be derived to describe an overall quality of the hurdle, flight, and entry into water, taking into account of the aforementioned player analytics as well as detected water splashes the diver makes upon entry into water.

In general, the term analytics refer to meaningful patterns, knowledges, and information from data or statistics. In this disclosure, challenge analytics refer to quantitative and qualitative characterizations of an attempt to perform a particular challenge. For example, shot analytics for a ball game refer to quantitative and qualitative characterizations of shot attempts, including but not limited to, shot types, shooter movement patterns, shooter moving speed, moving direction, jump height and type, shot release time and angle, and posture statistics such as body bend angle, leg bend ratio, and leg power. Each challenge analytic is specific to a given challenge attempt. Similarly, player analytics for a physical game refer to quantitative and qualitative characterizations of player actions, specific to a given player. Examples of player analytics include, but are not limited to, postures, back bend angle, jump height, body rotation, movement pattern and speed, challenge attempt results and quality scores. An analytic may be both a challenge analytic specific to a given challenge attempt, and a player analytic specific to the player making the challenge attempt. For a ball game, an analytic may be both a shot analytic specific to a given shot attempt, and a player analytic specific to the player making the shot attempt, if player identity is known or can be determined from image analysis. In addition, game analytics generally refer to statistical analytics generated from player analytics and optionally shot analytics over the duration of a game, and team analytics refer to analytics aggregated across players of a team.

In the exemplary embodiment shown in FIG. 1A, NEX system modules implemented on mobile devices 134, 144, and 154 may communicate with each other, directly or through a NEX game server 110 via network 120. For a three-point basketball contest, mobile devices 134, 144, and 154 may first synchronize with each other to jointly initiate a game. Each mobile device may analyze a captured image of the gaming area to ensure a foot location of each active player is outside the three point line. An audio announcement may be made by each mobile device for individual players to start the shootout. In some embodiments, player analytics collected by one mobile device may be uploaded to NEX server 110, and in turn downloaded to all other mobile devices. Each mobile device may generate updated feedback to its associated player, based on one or more player analytics collected from one or more players.

While multiple remote players are shown in FIG. 1A, in some embodiments, an interactive physical game may be played by a single player. For example, mobile device 134 may monitor player 131's shootouts during a 10-minute time period using computer vision techniques as disclosed herein, and provide periodical feedbacks every minute on the amount of time remaining and the number of make/misses so far.

In some embodiments, players 131, 141, 142, and 151 play the interactive physical game synchronously, or in real-time. That is, a game is initiated at the same time in gaming areas 130, 140, and 150, and individual game plays in each gaming area overlap entirely in time. The terms "same time" and "overlap in time" take into account of possible network delays, and minor time differences where one player may be initializing the game while another player has started the physical play. In some embodiments, game plays in gaming areas 130, 140, and 150 may take place in an asynchronous fashion, wherein individual game plays may overlap only partially in time, or do not overlap in time at all. For example, one player may carry out a 5-minute three-point shootout in the morning on a given day, while other players may do the same in the afternoon of the same day, or on a different day, and each player may be scored on his or her own performance to generate player analytics and game analytics. In some embodiments, players who play later may be allowed to watch game recordings of earlier plays by other players, regardless of whether the earlier plays are still in session. Thus, an asynchronously played game may be viewed as lasting for a duration covering all constituent game plays, where each individual game play may occur by individual players' selections.

In some embodiments, players may watch past game recordings of opponents or professional players on demand to study others' forms or tactics, even if no active game is happening. An asynchronously played game may also be viewed as having a player playing against a game video recording, or analytics collected from a game video recording. In some embodiments, a player or multiple players may choose to play against an existing game video recording in the NEX system. For example, a NEX system user may choose an instructional three-point shootout by a celebrity player such as Stephen Curry, and perform individual three-point shots from same court positions and with same shot forms as in the instructional game recording.

Figure 1B:
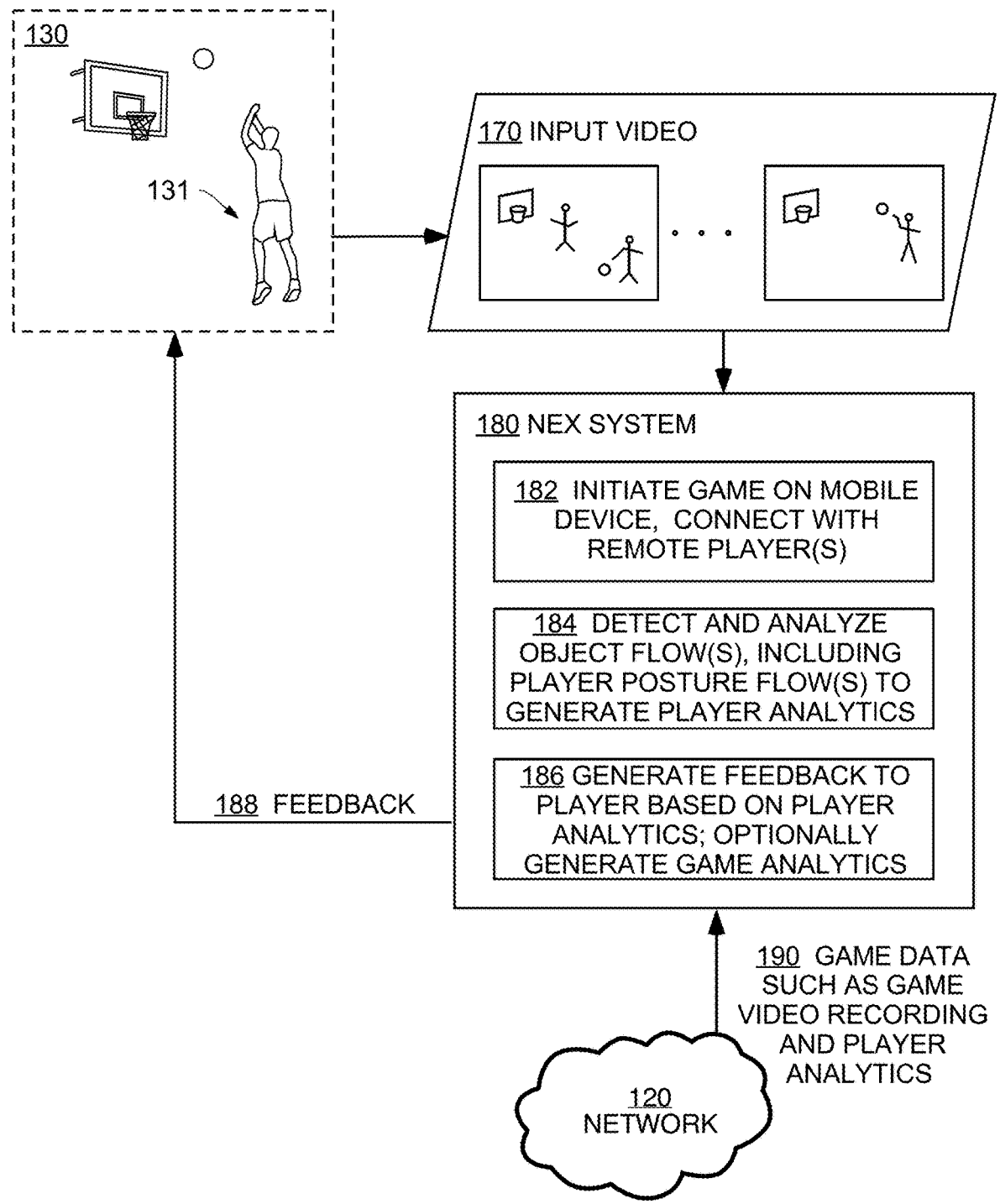
FIG. 1B is an architectural overview of a mobile device-based system for interactive physical gaming, according to one embodiment of the present invention.

FIG. 1B is an architectural overview 160 of a mobile device-based system for interactive physical gaming, according to one embodiment of the present invention. A NEX system 180 shown in FIG. 1B may be implemented on mobile device such as 134 to capture player actions in game area 130. More specifically, mobile device 134 may capture an input video 170 of gaming area 130 using an on-device camera. At step 182, an interactive game is initiated on the mobile device, possibly connecting with other remote players for a multiplayer game. At step 184, object flows are detected and analyzed, including player posture flows to generate player analytics. In step 186, feedback 188 to player 131 is generated, possibly based on one or more player analytics from player 131 and/or one or more other players, received as game data 190 via connected network 120.

In step 184, to analyze various user and/or ball movements, the NEX system may take, as input, a user and/or ball movement video. In the exemplary embodiment shown in FIG. 1B, the input video is a real-time video stream from a live-camera. In some embodiments such as in an asynchronous game, an input video may be a previously recorded video. A convolutional neural network (CNN) may be applied to some or all frames of the user and/or ball movement video to detect balls (e.g., basketballs, soccer balls, etc.), individual players, and their postures in the video. A tracking algorithm may then be performed to track all detected balls and postures, where multiple balls or postures may be present in each frame of the shot attempt video, to generate multiple ball flows and posture flows. In some embodiments, a flow can refer to object instances from different frames. All object instances in the same flow may be considered the same object. In other words, for a ball or posture in a flow, all instances of the ball or posture in all frames of the video are identified as the same object. When a single player is being recorded for the game, the detected posture flow is associated with the player directly. When multiple players are being recorded for the game, the NEX system may distinguish the players based on visual features such as jersey colors or distinguishing facial or body features, and each player may register with the NEX system before the start of the game by logging in such visual features.

To detect objects of interests such as balls and players from frames of the input video, one or more convolutional neural networks (CNN) may be applied. Each CNN module may be trained using one or more prior input videos. A CNN utilizes the process of convolution to capture the spatial and temporal dependencies in an image, and to extract features from the input video for object detection. Feature extraction in turn enables segmentation or identification of image areas representing balls and players, and further analysis to determine player body postures. A ball moves through space, leading to changing size and location from video frame to video frame. A player also moves through space while handling the ball, leading to both changing locations, sizes, and body postures.

In computer vision, pose or posture estimation is the task of identifying or detecting the position and orientation of an object in an image, relative to some coordinate system. This is generally formulated as the process of determining key point locations that describe the object. In the case of a ball, pose estimation may refer to determining the center and radius of the ball in the image plane. Hand pose estimation, on the other hand, is the process of determining finger joints and fingertips in a given image, where the whole hand is viewed as one object. Head pose estimation is the process of determining and analyzing facial features to obtain the 3D orientation of human head with respect to some reference point. Human pose estimation is the process of detecting major part and joints of the body, such as head, torso, shoulder, ankle, knee, and wrist. In this disclosure, "player posture" and "player pose" are used interchangeably to refer to either or both of the image of a human player segmented from the input video, and a set of key points extracted from the image to represent body pose or posture. In addition, instead of only determining whether an object such as a ball or a player is present in a given video frame, object detection or extraction in the present disclosure refers to determining the relative position, size, and/or pose of a ball, player, or other entities of interest.

Once objects are detected or extracted from individual frames, object flows may be established by grouping detected objects along a time line. Object movements across frames are continuous in the sense that object locations can only change in small increments from one video frame to the next. Thus, detected objects may be grouped based on location information into one or more object flows. For example, object flows may be established by computing a matching score for each object and existing object flow combination, and assigning objects to existing object flows with the highest matching score. At the beginning when no object flows yet exist, an initialization process may be performed based on an initial collection of a small number of objects, detected with high accuracy. In addition, a new flow may be created if the detected object does not match to any existing flows with a high score.

Implementation Using Computer Program Products, Methods, and Computing Entities

Exemplary System Architecture

Figure 2:
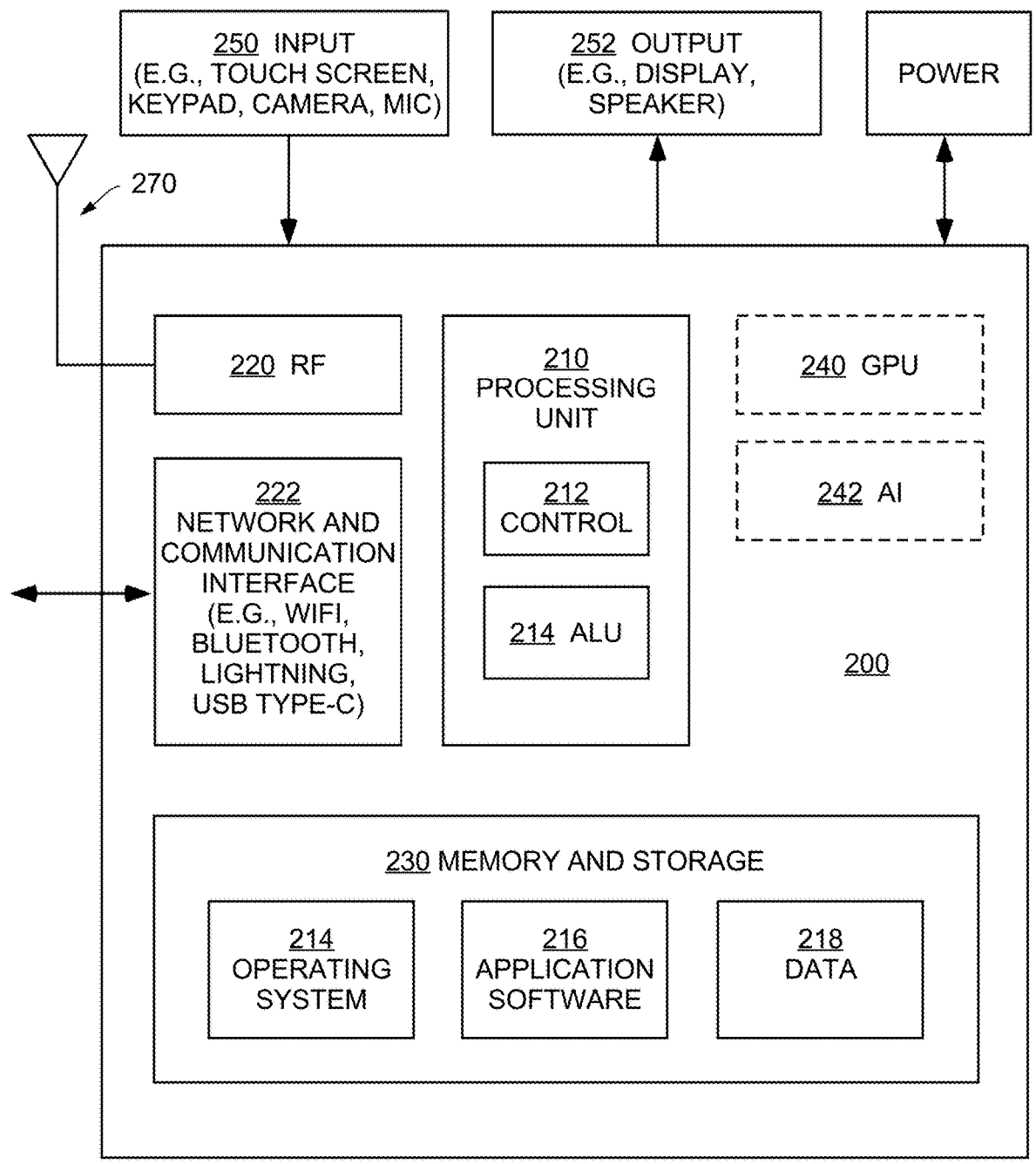
FIG. 2 is an exemplary schematic diagram of a user computing entity for implementing an interactive physical gaming system, according to exemplary embodiments of the present invention.
Figure 3:
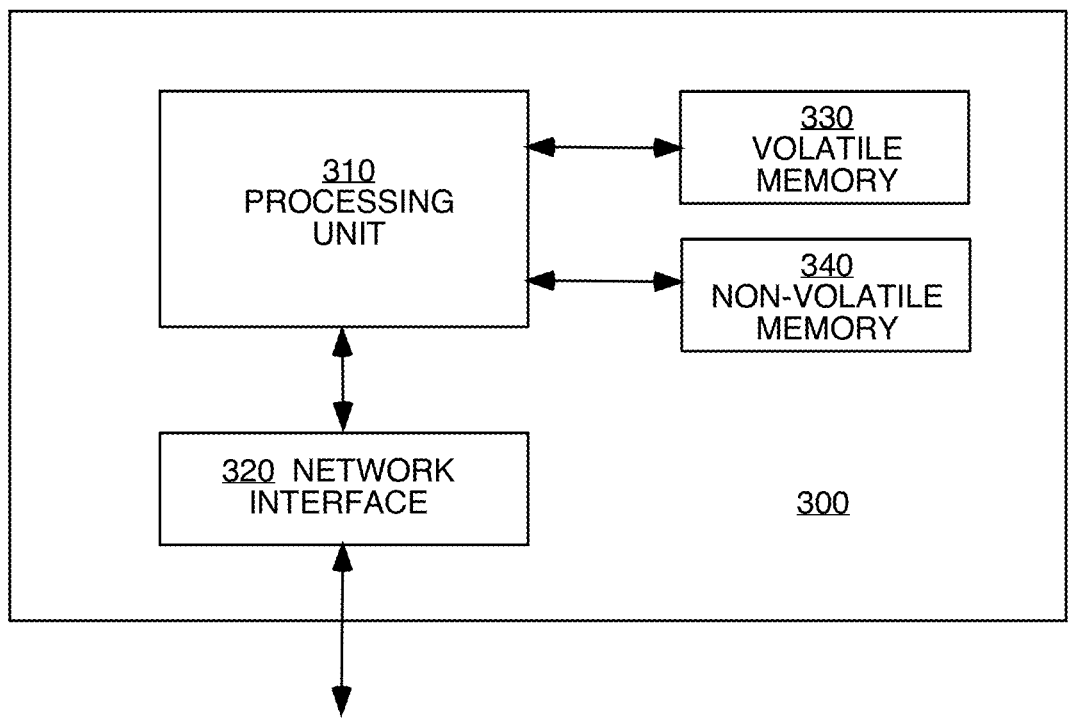
FIG. 3 is an exemplary schematic diagram of a management computing entity for implementing an interactive physical gaming system, according to exemplary embodiments of the present invention.

An exemplary embodiment of the present disclosure may include one or more user computing entities 200, one or more networks, and one or more server or management computing entities 300, as shown in FIGS. 2 and 3. Each of these components, entities, devices, systems, and similar words used herein interchangeably may be in direct or indirect communication with, for example, one another over the same or different wired or wireless networks. Additionally, while FIGS. 2 and 3 illustrate the various system entities as separate, standalone entities, the various embodiments are not limited to this particular architecture.

Exemplary User Computing Entity

FIG. 2 is an exemplary schematic diagram of a user computing device for implementing an interactive physical gaming system, according to exemplary embodiments of the present invention. A user operates a user computing device 200 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 200 may be a mobile device, and may be operated by a user participating in an interactive physical game. On the other hand, a server 110 may be implemented according to the exemplary schematic diagram shown in FIG. 3, possibly in the cloud, and possibly with logically or physically distributed architectures.

As shown in FIG. 2, the user computing entity 200 may include an antenna 270, a radio transceiver 220, and a processing unit 210 that provides signals to and receives signals from the transceiver. The signals provided to and received from the transceiver may include signaling information in accordance with air interface standards of applicable wireless systems. In this regard, the user computing entity 200 may be capable of operating with one or more air interface standards, communication protocols, modulation types, and access types. More particularly, the user computing entity 200 may operate in accordance with any of a number of wireless communication standards and protocols. In some embodiments, user computing entity 200 may operate in accordance with multiple wireless communication standards and protocols, such as 5G, UMTS, FDM, OFDM, TDM, TDMA, E-TDMA, GPRS, extended GPRS, CDMA, CDMA2000, 1xRTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or or the like. Similarly, the user computing entity 200 may operate in accordance with multiple wired communication standards and protocols, via a network and communication interface 222.

Via these communication standards and protocols, the user computing entity 200 can communicate with various other computing entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). User computing entity 200 can also download changes, add-ons, and updates, for instance, to its firmware, software (e.g., including executable instructions, applications, program modules), and operating system.

In some implementations, processing unit 210 may be embodied in several different ways. For example, processing unit 210 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 210 may be configured for a particular use or configured to execute instructions stored in volatile or non-volatile media or otherwise accessible to the processing unit. As such, whether configured by hardware or computer program products, or by a combination thereof, processing unit 210 may be capable of performing steps or operations according to embodiments of the present invention when configured accordingly.

In some embodiments, processing unit 210 may comprise a control unit 212 and a dedicated arithmetic logic unit 214 (ALU) to perform arithmetic and logic operations. In some embodiments, user computing entity 200 may optionally comprise a graphics processing unit 240 (GPU) for specialized image and video rendering tasks, and/or an artificial intelligence (AI) accelerator 242, specialized for applications including artificial neural networks, machine vision, and machine learning. In some embodiments, processing unit 210 may be coupled with GPU 240 and/or AI accelerator 242 to distribute and coordinate processing tasks.

In some embodiments, user computing entity 200 may include a user interface, comprising an input interface 250 and an output interface 252, each coupled to processing unit 210. User input interface 250 may comprise any of a number of devices or interfaces allowing the user computing entity 200 to receive data, such as a keypad (hard or soft), a touch display, a mic for voice/speech, and a camera for motion or posture interfaces. User output interface 252 may comprise any of a number of devices or interfaces allowing user computing entity 200 to provide information to a user, such as through the touch display, or a speaker for audio outputs. In some embodiments, output interface 252 may connect user computing entity 200 to an external loudspeaker or projector, for audio or visual output.

User computing entity 200 may also include volatile and/or non-volatile storage or memory 230, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 214, application software 216, data 218, databases, database instances, database management systems, programs, program modules, scripts, source code, object code, byte code, compiled code, interpreted code, machine code, executable instructions, and/or the like to implement the functions of user computing entity 200. As indicated, this may include a user application that is resident on the entity or accessible through a browser or other user interface for communicating with a management computing entity and/or various other computing entities.

In some embodiments, user computing entity 200 may include location determining aspects, devices, modules, functionalities, and/or similar words used herein interchangeably. For example, user computing entity 200 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 200 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In an interactive physical game, a user computing entity 200 may be deployed (e.g., installed; configured; accepted; installed and accepted; configured and accepted; installed, configured, and accepted; or the like) in a gaming area that includes players and/or game equipment. In some embodiments, at least one input device on user computing entity 200 may collect or may be configured to collect information (e.g., data, metadata, and/or signaling) indicative of operational features of the gaming area and/or equipment for analysis by processing unit 210. For example, computer vision algorithms as implemented on user computer entity 200 may be configured to detect the location of one or more balls or goal posts in an input video as captured by an input camera device.

In some embodiments, a system for remote multiplayer gameplay may include: (1) At least one user computing device such as a mobile computing device and optionally a mounting apparatus for the at least one mobile computing device. The mounting apparatus may be a tripod or a kickstand, and may mount the electronic device with a camera of the user computing device positioned to monitor a gaming area. In some embodiments, the user computing device may be hand-held. (2) A sound device, for example, earbuds (e.g., wireless earbuds) or a speaker system (e.g., a public address (PA) system) coupled to the at least one user computing device. The sound device may serve to provide instruction and feedback regarding the game to one or more players. (3) Optionally, an optical device such as a projector, a laser pointing system, a jumbotron, a television screen, or the like, that can facilitate a gameplay. For example, a laser pointing system may point to a location to direct a user to position themselves, or serve as a scoreboard.

In some embodiments, the user computing device may communicate to external devices like other smartphones and/or access points to receive information such as software or firmware, or to send information (e.g., game data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. At least two of the users may be in geographically different gaming areas. In some embodiments, the user computing devices may use a network interface such as 222 to communicate with various other computing entities, such as by communicating data, content, information, and/or similar terms used herein interchangeably that can be transmitted, received, operated on, processed, displayed, stored, and/or the like.

In some embodiments, data (e.g., game statistics, scores, video, etc.) may be uploaded by one or more user computing devices to a server such as shown in FIG. 3 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate an interactive game. In some embodiments, audio may be used to (i) direct users to particular positions on gaming areas (with further audio feedback to help the users locate themselves more accurately), (ii) inform users about a motion or action that a user needs to do as part of the game (e.g., shoot a ball at a basket, perform a back flip, perform an exercise such as pushups, and the like), and (iii) provide feedback to the user (e.g., to inform them if the users are making a wrong move, running out of time, have successfully completed a given task, or achieved a particular score); and (iv) report on the progress of the game (statistics, leaderboard, eliminations, and the like). In some embodiments, speech recognition and corresponding responses (e.g., audio, visual, textual, etc. responses) may also be used to facilitate the game by allowing users to set options, correct mistakes, or start or stop the game.

In some embodiments, artificial intelligence-based computer vision algorithms may be used to perform at least one of the following: (i) ensure that users are located where they should be, (ii) determine when/if users successfully complete a task, (iii) rank the quality of users' motion/action, and (iv) award style points or other attributes depending on the nature of the users' motion (e.g., in a game of basketball, determining whether a user scored by dunking or by performing a layup).

In various embodiments, during the physical activities performed by users, the mobile computing device may not be on the user's person, and instructions may be given via a speaker or other remote devices connected to the mobile device. Further, computer vision algorithms may be used on the mobile device to guide and monitor gameplay being conducted within the mobile device camera's field of view. Accordingly, embodiments of devices described herein can employ artificial intelligence (AI) to facilitate automating one or more gameplay features of functionalities as described herein.

To provide for or aid in the numerous determinations (e.g., determine, ascertain, infer, calculate, predict, prognose, estimate, derive, forecast, detect, compute) of game settings, player postures, player analytics, shot analytics, and game analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, game instructions and player feedbacks may be generated from one or more player analytics derived from user game actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 3 is an exemplary schematic diagram of a management computing entity 300, such as NEX server 110, for implementing an interactive physical gaming system, according to exemplary embodiments of the present invention. The terms computing entity, computer, entity, device, system, and/or similar words used herein interchangeably are explained in detailed with reference to user computing entity 200.

As indicated, in one embodiment, management computing entity 300 may include one or more network or communications interface 320 for communicating with various computing entities, such as by communicating data, content, information, and/or similar terms used herein interchangeably that can be transmitted, received, operated on, processed, displayed, stored, and/or the like. For instance, management computing entity 300 may communicate with user computing device 200 and/or a variety of other computing entities. Network or communications interface 320 may utilized a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 300 may be configured to communicate via wireless external communication networks using any of a variety of standards and protocols as discussed with reference to user computing device 200.

As shown in FIG. 3, in one embodiment, management computing entity 300 may include or be in communication with one or more processing unit 310 (also referred to as processors, processing circuitry, processing element, and/or similar terms used herein interchangeably) that communicate with other elements within the management computing entity 300. As will be understood, processing unit 310 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 310 may be configured for a particular use or configured to execute instructions stored in volatile or non-volatile media 330 and 340. As such, whether configured by hardware or computer program products, or by a combination thereof, processing unit 310 may be capable of performing steps or operations according to embodiments of the present disclosure when configured accordingly.

Although not shown explicitly, management computing entity 300 may include or be in communication with one or more input elements, such as a keyboard, a mouse, a touch screen/display, a camera for motion and movement input, a mic for audio input, a joystick, and/or the like. Management computing entity 300 may also include or be in communication with one or more output elements such as speaker, screen/display, and/or the like.

In various embodiments, one or more of the components of management computing entity 300 may be located remotely from other management computing entity components, such as in a distributed system or in the cloud. Furthermore, one or more of the components may be combined and additional components performing functions described herein may be included in the management computing entity 300.

Machine Vision and Machine Learning Modules

As described herein, embodiments of the present invention use one or more artificial intelligence, machine vision, and machine learning algorithms or modules for analyzing game videos and facilitating gameplays. Various exemplary machine vision algorithms are within the scope of the present invention used for performing object recognition, gesture recognition, pose estimation, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example a convolutional neural network (CNN). Neural networks are computer systems inspired by the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks utilize the process of convolution to reduce the number of model parameters involved, while successfully capturing the spatial and temporal dependencies in an image.

Figure 4:
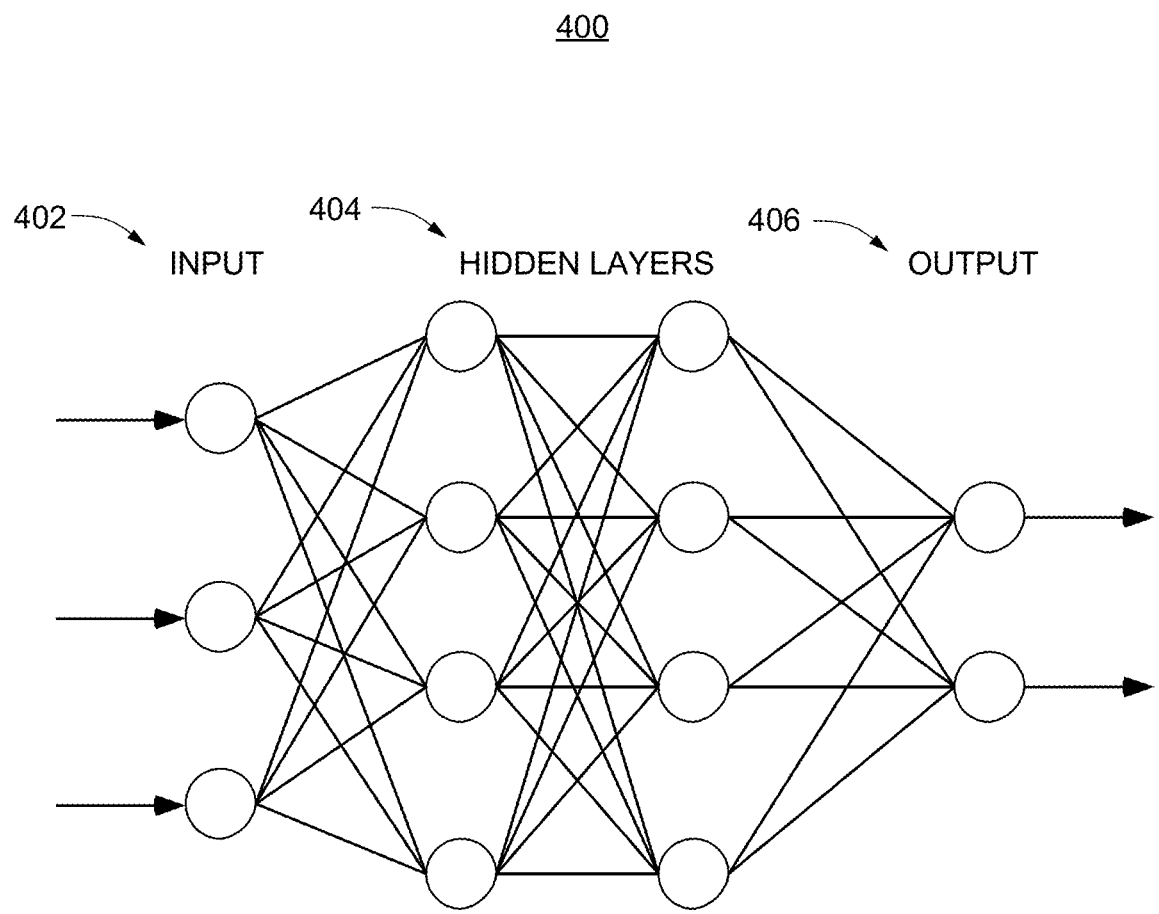
FIG. 4 shows an illustrative block diagram of a convolutional neural network (CNN) for image analysis, according to exemplary embodiments of the present invention.

More specifically, FIG. 4 shows an illustrative block diagram 400 of a convolutional neural network (CNN) for image analysis and object recognition, according to exemplary embodiments of the present invention. This exemplary CNN module 400 may be utilized for implementing various machine vision algorithms described herein. For example, it may be designed and trained to determine gestures and poses and other machine vision tasks required by the present invention, as would be recognized by one of ordinary skill in the art. An input layer 402 is connected via a multiplicity of hidden layers 404 to an output layer 406. Input layer 402 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and is needed before classification or output activation at output layer 406. Successive convolution-ReLU-pooling stages allow the successive extraction of low-level to high-level features, from edges, general shapes such as line and circles, to specific shapes representing specific objects. FIG. 8A to 8E provide exemplary block diagrams of a detailed neural network design for pose estimation.

FIG. 4 shows only one illustrative CNN architecture that is within the scope of the present invention, but the present invention is not limited to the use of CNNs. Other machine vision algorithms are also within the scope of the present invention.

Illustrative Machine Learning Architectures

Figure 5:
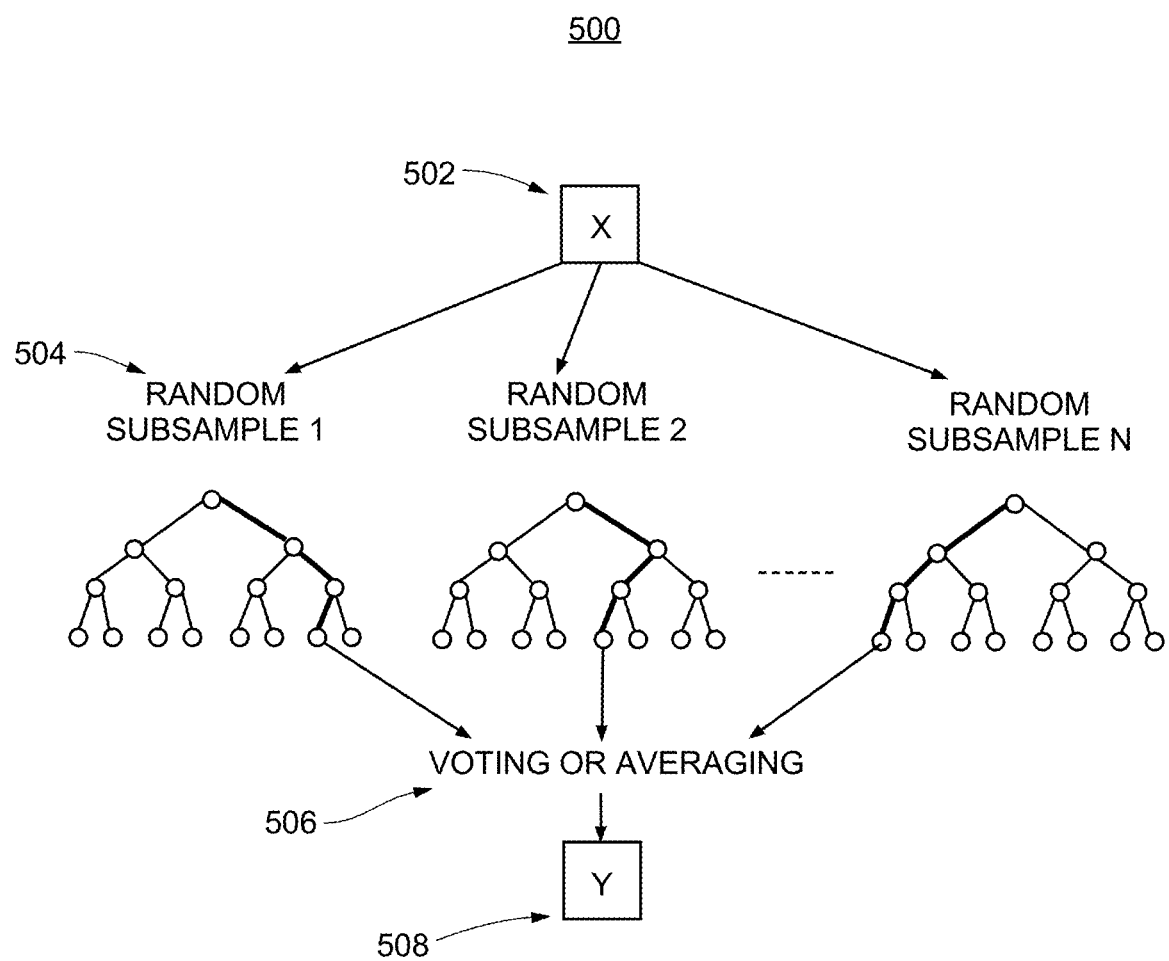
FIG. 5 shows an illustrative block diagram for a machine learning algorithm, according to exemplary embodiments of the present invention.

As states herein, various exemplary machine vision and machine learning algorithms are within the scope of the present invention for performing object recognition, gesture recognition, pose estimation, and so forth. FIG. 5 shows an illustrative block diagram 500 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 504, each depending on the values of a random subset of a training data set 502, the chances of overfitting to the training data set may be minimized. The decision tree predictors are voted or averaged at a decision step 506 to obtain predictions 508 of the random forest algorithm. For the task of object recognition, input 502 to the machine learning algorithm may include feature values, while output 508 may include predicted gestures and/or poses associated with a user. In one embodiment, the random forest algorithm is implementation as described in Leo Breiman, *Random Forests*, Machine Learning, 45, 5-32, 2001, Kluwer Academic Publishers, Netherlands, available at doi.org/10.1023/ A: 1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including object recognition, gesture recognition, and pose estimation.

Training the Machine Learning Algorithms

Figure 6:
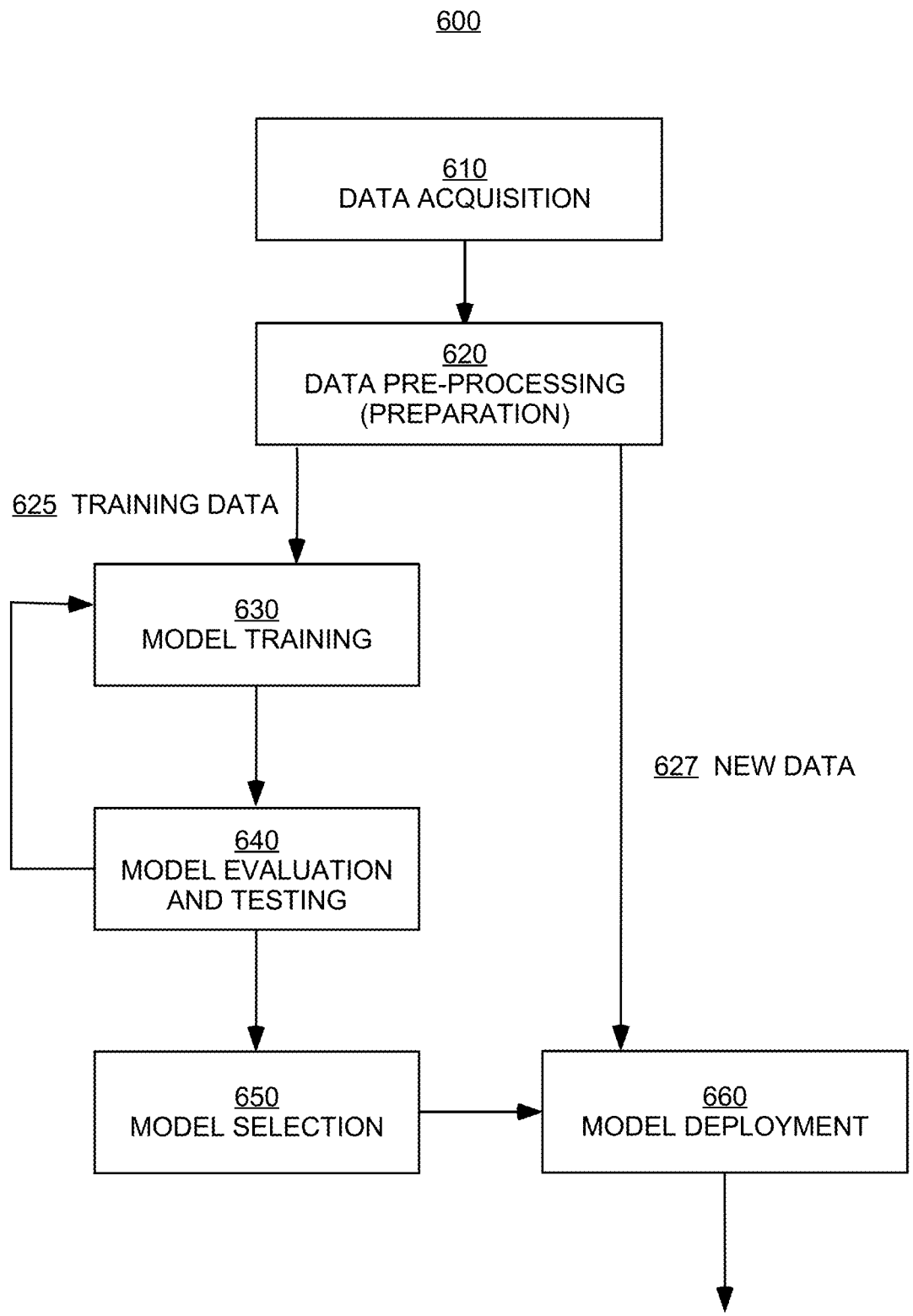
FIG. 6 shows an illustrative flow diagram for training a machine learning algorithm, according to exemplary embodiments of the present invention.

FIG. 6 shows an exemplary flow diagram 600 for training a machine learning (ML) algorithm, which may be utilized in object recognition, pose estimation, and object flow construction, according to exemplary embodiments of the present invention;

The training process begins at step 610 with data acquisition. At step 620, acquired data are pre-processed, or prepared. At step 630, a machine learning model is trained using training data 625. At step 640, the model is evaluated and tested, and further refinements to the model are fed back into step 630. At step 650, optimal model parameters are selected, for deployment at step 660. New data 627 may be used by the deployed model to make predictions.

A starting point for any machine learning method such as used by the machine learning component above is a documented dataset containing multiple instances of system inputs and correct outcomes (e.g., the training data). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system output depends on (a) pattern parameterization, (b) learning machine design, and (c) quality of the training database. These components may be refined and optimized using various methods. For example, the database may be refined by adding datasets for new documented gestures and poses. The quality of the database may be improved, for example, by populating the database with cases in which the gestures and/or poses were correctly recognized. In one embodiment, the database includes data, for example, of mistaken identification of gestures and/or poses, which may assist in the evaluation of a trained system.

Figure 7:
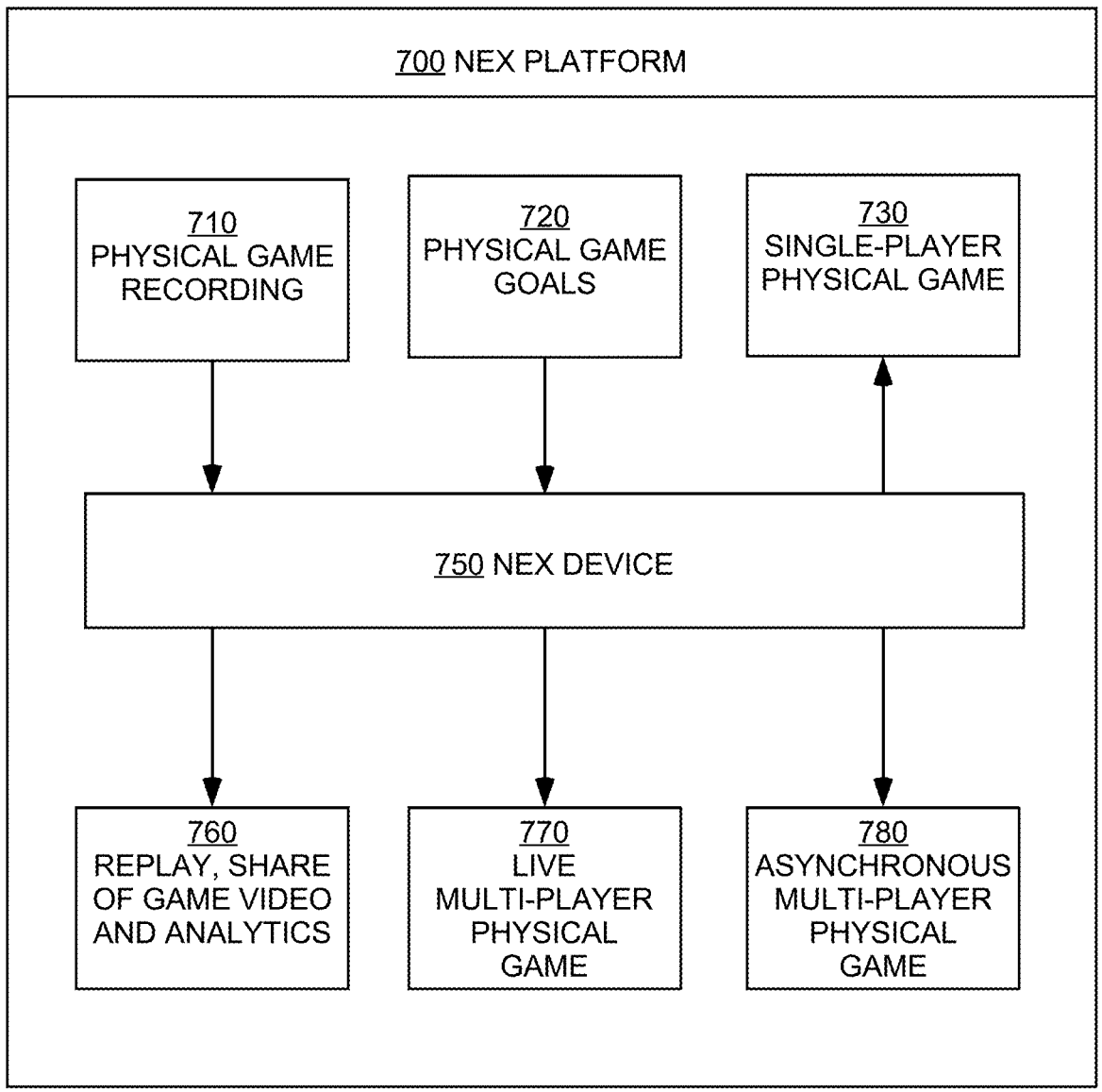
FIG. 7 is a schematic diagram illustrating a NEX platform, according to exemplary embodiments of the present invention.

FIG. 7 is a schematic diagram illustrating and summarizing some functionalities provided by an extended NEX platform 700, according to one embodiment of the present invention. In particular, a NEX device 750 may take in physical game goals or challenges 720, and facilitate different types of interactive physical games, including single-player physical game 730, live multi-player physical game 770, and asynchronous multi-player physical game 780. In some embodiments, the NEX system enables interactive physical games based on past game recordings 710, where a player can choose to challenge game actions in the recording. In some embodiments, the NEX system may capture interactive physical games not only for player analytics generation, but also for later replay and share of game video and analytics 760.

Although NEX device 750 as shown in FIG. 7 serves as the core for a NEX platform 700, in some embodiments such as multi-player games, NEX platform 700 may be networked among multiple user devices, where a NEX server may be connected to multiple camera-enabled user computing devices, each used to capture user or game data, and for providing game analytics. Such game video and/or analytics data may be uploaded to the NEX server, which in term may store and facilitate sharing of such data among individual players/users.

Exemplary Convolutional Neural Networks (CNNs) for Pose Estimation

Figure 8A:
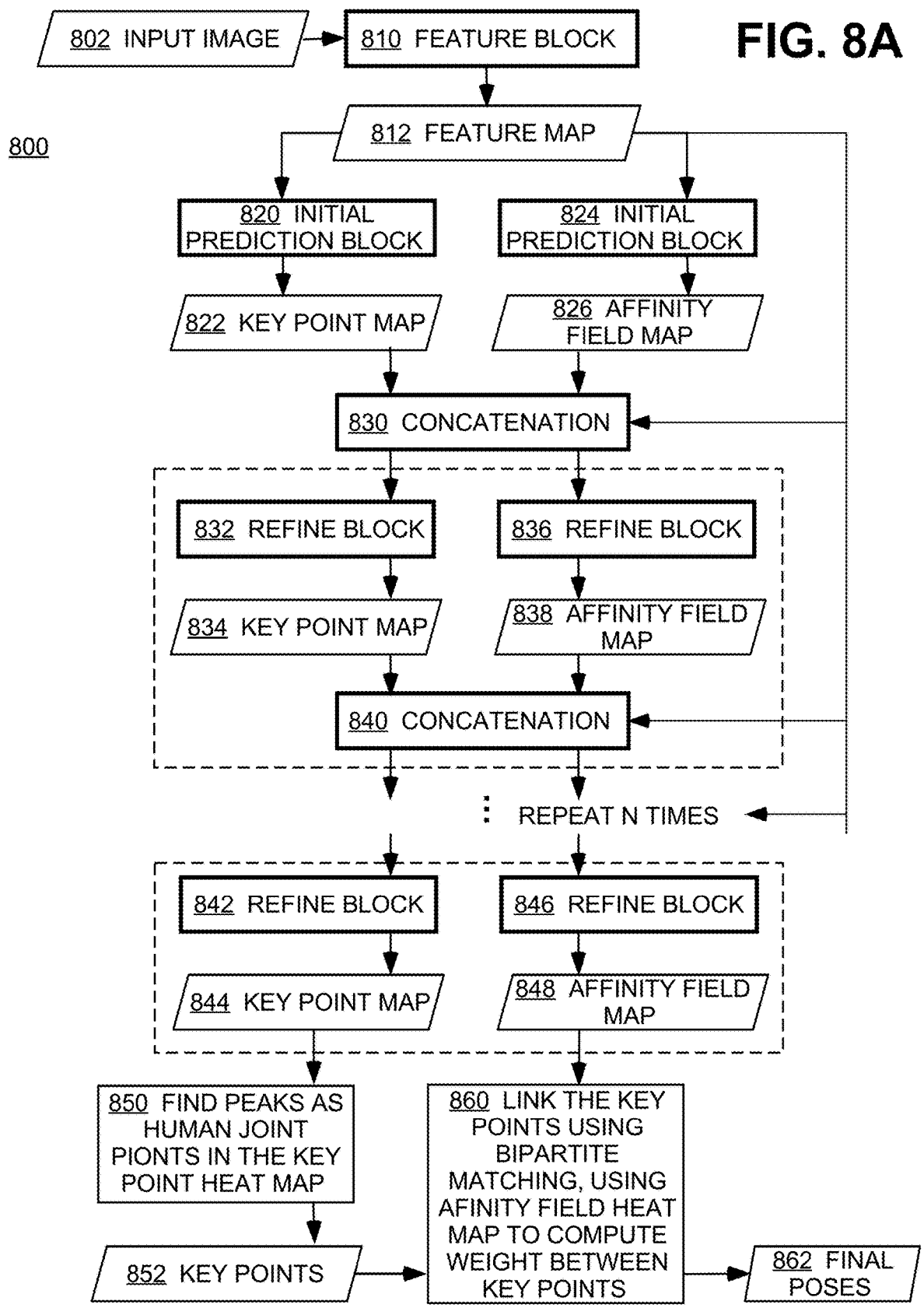
FIG. 8A is a block diagram of an exemplary neural network for pose estimation, according to exemplary embodiments of the present invention.

FIG. 8A is a block diagram 800 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 8A performs the following steps to estimate the pose of one or more persons in an input image:

1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, an input image 802 is first passed through a feature block 810 to generate a feature map 812. Initial prediction blocks 820 and 824 then extract a key point map 822 and an affinity field map 826, respectively. A concatenation operation 830 is performed before further refinements are carried out in multiple iterations. For each stage of iteration, refine blocks such as 832, 836, 842, and 846 predict refined key point maps such as 834 and 844, and refined affinity field maps such as 838 and 848, respectively. Concatenation operations such as 840 are performed to generate input for the next stage. A total of N refinements may be carried out, where N may be any positive integer. For example, N may equal to 5 in some embodiments of the present invention. After the last refinement stage, key point heat map 844 is examined in step 850 to find peaks as human joint points or key points 852. Such key points may be linked in step 860 to generate final poses 862, by performing bipartite matching using affinity field heat map 848 to compute weights between key points. In this illustrative example, key point map 844 may comprise 18 channels, while affinity field map 848 may comprise 34 channels.

FIG. 8B is a detailed block diagram illustrating an exemplary Feature Block 810, according to some embodiments of the present invention. In this example, separable convolutional layers (SCL) are deployed with different kernel and stride sizes.

Correspondingly, FIG. 8C is a detailed block diagram illustrating an exemplary separable convolutional neural network layer 870, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Figures 8D, 8E:
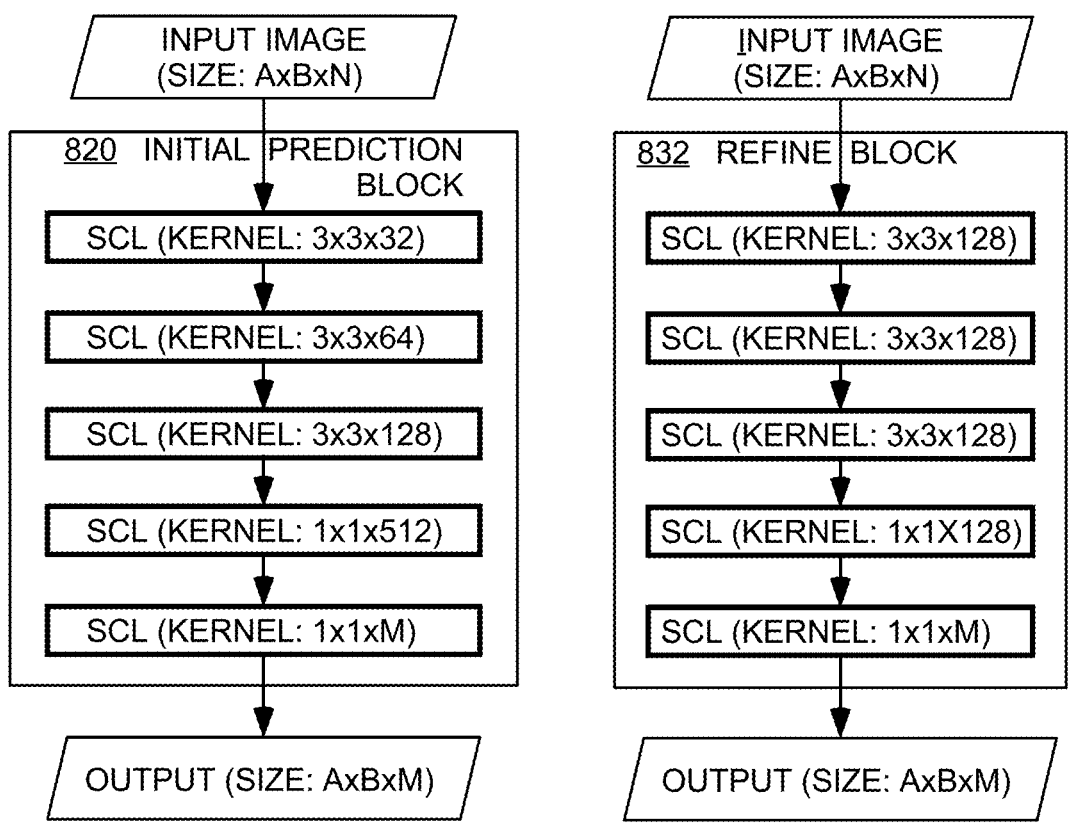
FIG. 8D is a detailed block diagram illustrating an exemplary Initial Prediction Block, according to exemplary embodiments of the present invention.
FIG. 8E is a detailed block diagram illustrating an exemplary Refine Block, according to exemplary embodiments of the present invention.

FIG. 8D is a detailed block diagram illustrating an exemplary Initial Prediction Block 820, according to some embodiments of the present invention; FIG. 8E is a detailed block diagram illustrating an exemplary Refine Block 832, according to some embodiments of the present invention. Both comprise multiple separable convolutional layers having different kernel sizes.

In some implementations of the present invention, one or more of existing software modules may be utilized, including but not limited to, CoreML for CNN object and key point detection, SceneKit for rendering an AR court, and CoreMotion for understanding a mobile device's orientation.

Illustrative Exemplary Operations for Interactive Physical Gaming

Figure 9:
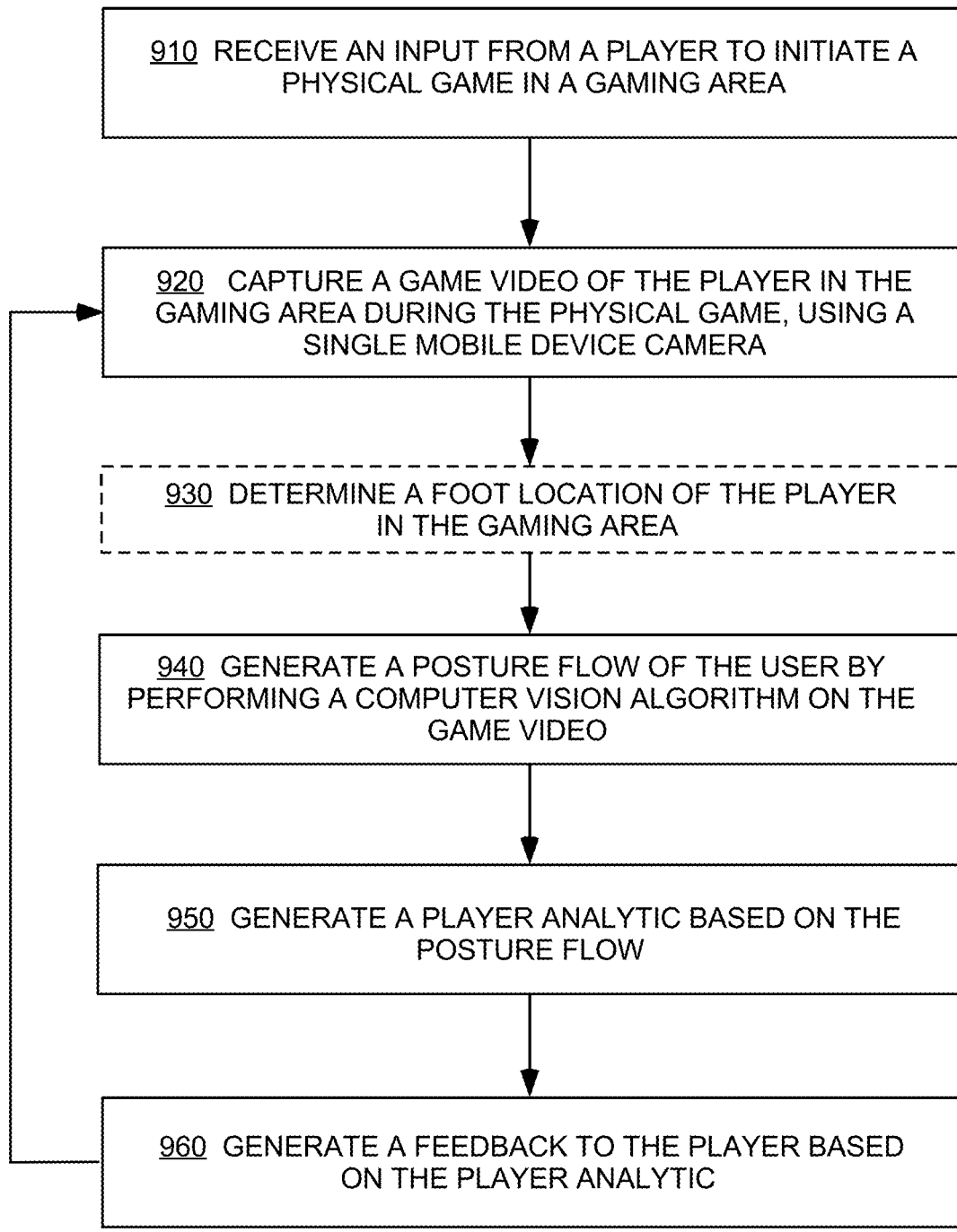
FIG. 9 shows a flowchart illustrating exemplary operations for an interactive physical game, according to exemplary embodiments of the present invention.

FIG. 9 shows a flowchart 900 illustrating exemplary operations for a single-player interactive physical game, according to one embodiment of the present invention. Process steps as described herein are also applicable to multiplayer interactive physical games facilitated by embodiments of the present invention.

Once a mobile device with an on-device camera is set up in a gaming area, at step 910, an input is received from a player to initiate a physical game in the gaming area. This initiation input may be explicit or implicit. For example, the user may click a "start" icon on a touch screen on the mobile device, utter or shout "start" to the device, or wave his hand in a pre-configured gesture pattern to signal a start of the game. Voice recognition and gesture/pose recognition techniques as described in the present disclosure may be deployed to identify such explicit initiation inputs. Alternatively, the NEX system may determine, through computer vision techniques, that the player has completed a particular action sequence that implicitly signals that the player is ready for the game. For example, the NEX system may determine that the player has moved into a desired position and stayed for a long-enough period of time, such as standing at the center of the free-throw line for longer than 5 seconds, and announce to the player that the game has been started.

Upon game initialization, at step 920, a game video is captured of the player in the gaming area during the physical game, using the on-device camera. This game video may be analyzed in real-time, saved in on-device memory, streamed to other user devices, streamed to a NEX server or database for view by other NEX users, or streamed to a third-party video hosting server for live-viewing by interested spectators.

At an optional step 930, a foot location of the player in the gaming area may be determined. Having a known foot location may help reduce the overall computation needed for generating a posture flow of the user at step 940, where one or more computer vision algorithms as disclosed herein may be deployed on the game video. In some embodiments, a head position instead of a foot position for the player may be determined at step 930.

At step 950, a player analytic is generated based on the posture flow. At step 960, a feedback to the player is generated based on the player analytic. As discussed with reference to FIGS. 1A and 1B, player analytics refer to quantitative and qualitative characterizations of player actions, specific to a given player. Examples of player analytics include, but are not limited to, postures, back bend angle, degree of body rotation, jump height, movement pattern, challenge attempt results and quality scores.

Figure 10:
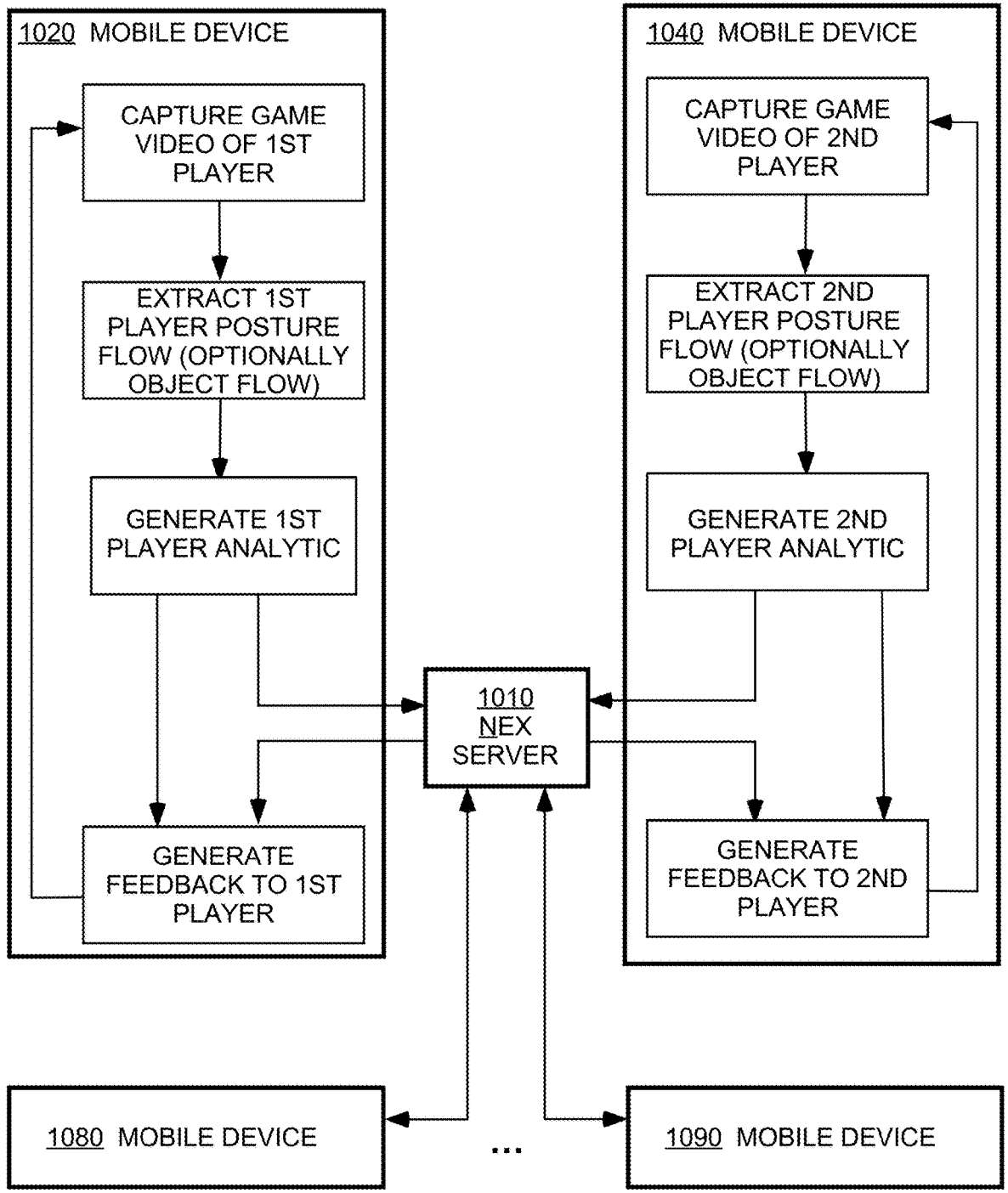
FIG. 10 shows a schematic diagram illustrating exemplary operations in a system for a remote multiplayer interactive physical game, according to exemplary embodiments of the present invention.

FIG. 10 shows a schematic diagram 1000 illustrating exemplary operations in a system for a remote multiplayer interactive physical game, according to one embodiment of the present invention. In this exemplary system, multiple mobile computing devices 1020, 1040, 1080 and 1090 are respectively connected to a NEX server 1010, and each mobile device may carry out process steps similar to those shown in FIG. 9. In a multi-player game, feedback to each participating player may depend on player analytics by other players as well. For example, in a basketball H-O-R-S-E game, if the leader and at least one other player are still active at the end of a round, the feedback message to the leader may be an announcement on who becomes the leader for the next round, and what shot type the leader has chosen to do; on the other hand, the leader may be claimed a winner if all other players have been eliminated at the end of the current round, and the feedback message to this winning player may be a congratulatory announcement.

FIG. 11 shows a flowchart 1100 illustrating exemplary operations at a user device for to a remote multiplayer interactive physical game, according to one embodiment of the present invention. Upon initialization at step 1110, a first game video is captured at step 1120 of a first player in a first play of a physical game, using a first camera on a first mobile computing device in a first gaming area associated with the first player. At step 1130, a first posture flow is extracted of the first player from the first game video, by performing a computer vision algorithm on one or more frames of the first game video. At step 1140, a first player analytic is generated based on the first posture flow. At step 1150, a second player analytic is received. This second player analytic was generated based on a second posture flow of a second player, and the second posture flow was extracted from a second game video of the second player in a second play of the physical game, captured by a second camera in a second gaming area associated with the second player. At step 1160, a feedback to the first player is generated, based on at least one of the first player analytic and the second player analytic.

Illustrative Examples of Remote Interactive Physical Games

In the following subsections, detailed illustrative examples of remote interactive games that may be played in the setting shown in FIG. 1A, using the system shown in FIG. 1B, and according to processes such as shown in FIGS. 9-11 are described. It would be understood by persons of ordinary skill in the art that such examples are for illustrative purposes only, and do not limit the scope of the invention.

An Illustrative Basketball Free-Throw Shooting Challenge

Figure 12A:
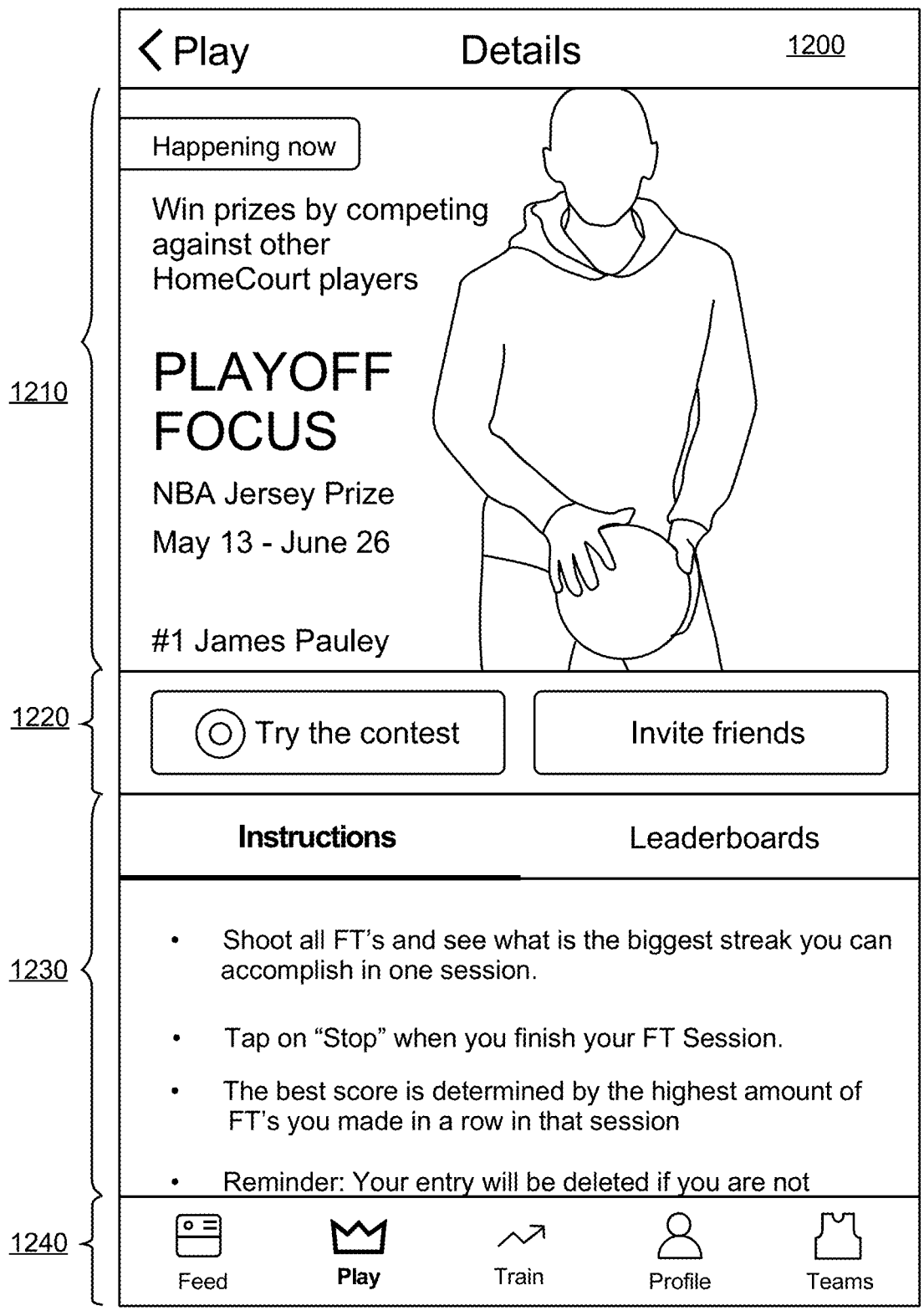
Figure 12B:
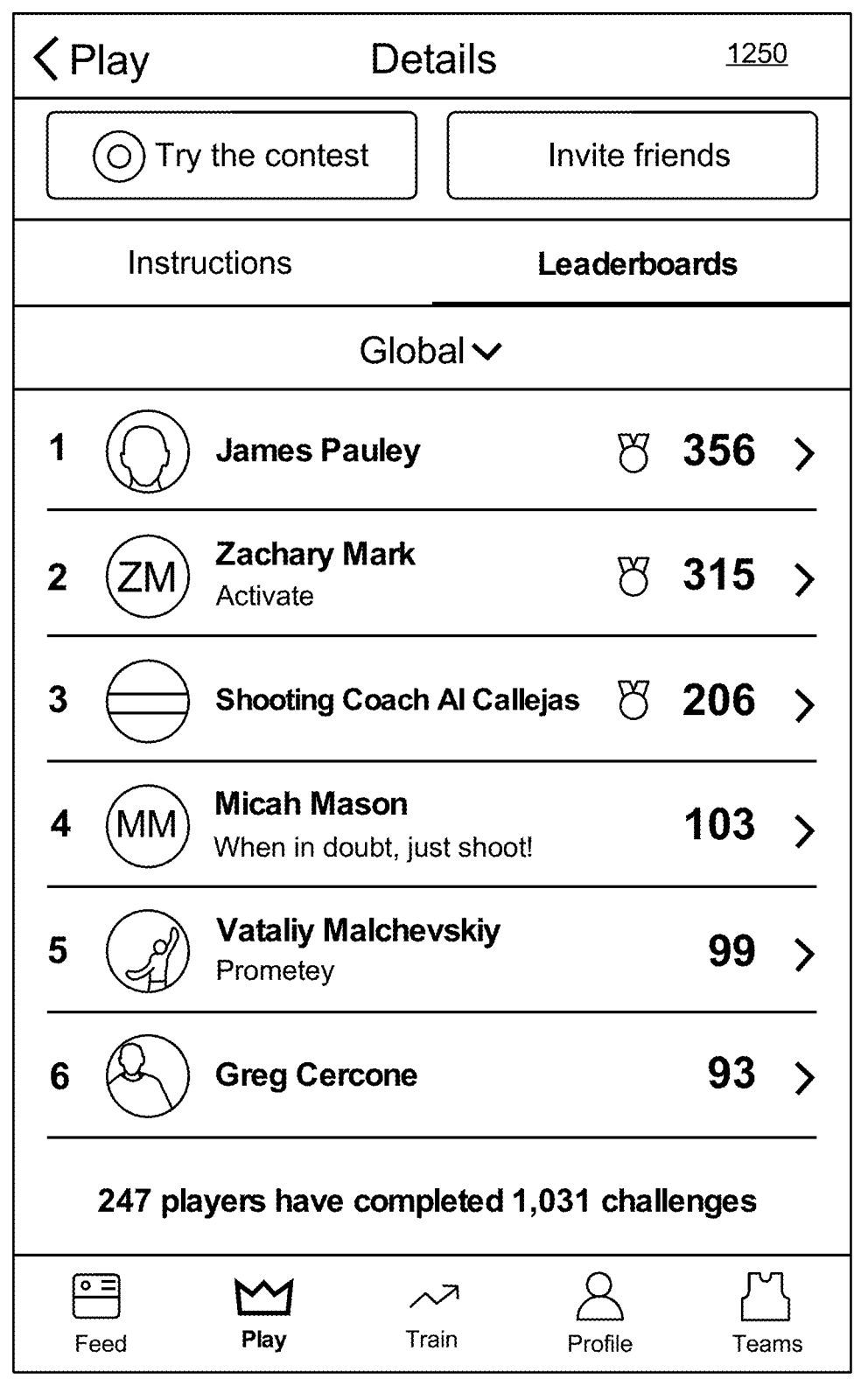

FIG. 12A is a screenshot 1200 of a play interface for a multiplayer interactive basketball free-throw competition facilitated by one embodiment of the present invention. Correspondingly, FIG. 12B is a screenshot 1250 of a leaderboard showing scores achieved by participating players.

In this embodiment, users of the NEX system on a mobile computing device may discover which games are available to join now, or in the future, by navigating through the system application using control icons in a panel 1240. Under the play interface such as show in FIG. 12A, an active game may be advertised in a top panel 1210, and user may choose to join the game using icons in a panel 1220, and may read instructions or look at a current leaderboard through a panel 1230.

As highlighted in panel 1210, in this particular game, individual NEX Players compete against each other to win prizes. For example, top two participants on the leaderboard may each win an NBA jersey to the team of their choice. Participants may also be chosen at random to win virtual prizes such as NEX system service subscriptions. A duration of this illustrative game is set to be between May 13 and June 26, and a current top player on the leader board is James Pauley.

For this illustrative game, rules (not shown explicitly) and instructions are provided to individual players in panel 1230. To participate, a player should play with a standard 10 ft basketball hoop. A gaming area may have any court dimensions as allowed by the NEX system, including but not limited to, High School (HS), College, International Basketball Federation (FIBA), and National Basketball Association (NBA). To play the game, a player shoots free-throws (FT) and is scored on the biggest streak accomplished in one session. In other words, the best score for a player is determined by a largest number of FTs made in a row. A session may finish automatically after a given time, or may be stopped manually by the player by tapping on a "Stop" icon on screen (not shown). A player may participate in the game as many times as desired. In some embodiments, challenges or play attempts are visible to all users, with the best score listed on a leaderboard, as illustrated by screenshot 1250 in FIG. 12B.

Although not shown explicitly, in various embodiments of the present invention, a participating player may play in his or her own gaming area using a mobile device implementation of the NEX system, where the NEX system manages an on-device camera to capture a game video of player actions, and analyzes accordingly to determine a score for the player, based on his or her FT shooting steaks. In some embodiments, a count of successful shots may be announced as feedbacks to the user periodically, such as for every shot, or every 5 shots, plus a total count or score when the player misses at the end of a run, or when the gameplay is stopped. In some embodiments, the score may be displayed on a screen of the mobile device. In some embodiments, a score by a current player may be sent to a NEX server, where a sorting algorithm is performed to generate a leaderboard comprising leading scores by participating players. Such leading scores may be in turn downloaded to the mobile device, possibly in the form of periodic updates, polling, or push notifications, for generating a display of the leaderboard shown in FIG. 12B. In some embodiments, the captured game video may be analyzed using the computer vision algorithms as disclosed herein to verify that the player has followed all the rules.

An Illustrative Basketball H-O-R-S-E Shooting Challenge

Another illustrative remote interactive basketball challenge that can be played with the NEX system is similar to a leader-based H-O-R-S-E (pronounced "horse") game. For this ball sport game, each gaming area may contain equipment such as a regulation height basketball hoop, a basketball, and a tripod. The tripod may be configured to mount a player's mobile device. For example, a game area may be set up so that the tripod with the mobile device has a clear view of the basketball hoop and a virtual or painted three-point line.

In a regular H-O-R-S-E game, players make shots in a predetermined order. A player who has the first turn is the leader and has control of the game. The leader first makes a shot of a type of his or her choosing. If the leader's shot is successful, subsequent players make attempts at the same shot type to duplicate the leader's shot. Those who miss the shot acquire one of the five letters in "H-O-R-S-E," starting with H. Once all players have made shot attempts, control moves onto a next player, and the game continues into another round. If the leader's shot is unsuccessful, control of the game moves to another player directly. A player who spells out the full "H-O-R-S-E" phrase loses the game and is eliminated from subsequent rounds.

In this exemplary interactive game, a first user or player such as a coach, a celebrity, a team captain, or a random player may serve as the leader. The leader may first configure the game by specifying one or more game settings including, but not limited to, the number of shot attempts per player per round, number of rounds, type of shots permitted, how points are awarded, game prizes, and the like.

The game may be initiated immediately upon configuration by the leader, or may be advertised to begin at a certain time. In some embodiments, the game may be offered to all users of the NEX platform. In some embodiments, the game may be offered to only a subset of users, such as those on a certain team, as part of a coaching exercise, in a certain geography, or with a certain skill level. Some embodiments of the NEX system provide social networking functionalities to allow users to play against friends, selected competitors, or strangers.

In some embodiments, once a game is initiated, additional users such as those in remote locations may have a certain amount of time to join. Each user who requests to join the game may be checked to see whether he or she qualifies. For example, a user may be accepted into the game if it is determined that a camera associated with the user is set up properly and the user is positioned at a pre-designated start position such as a foul line. Once the time period during which users may join the game has expired, or once a predetermined number of users have joined, an announcement may be made via audio, video, or text through each participating device or mobile device to indicate that the game has begun.

As in a regular H-O-R-S-E game, in this exemplary interactive game, a round of the game may be initiated via a first set of audio instructions, as generated by the NEX system, or by the leader, describing a challenge that players must complete within a certain timeframe. Some examples of challenges may include scoring or making a basket from the foul line or the three-point line, dunking the basketball, reverse dunking the basketball, scoring from a point that is approximately 45 degrees along the three-point line, answering a question such as "Who was the league MVP in 2013?", and the like. In some embodiments, the leader may perform a shot, and the NEX system may deploy computer vision techniques to determine a shot location, a shot type, and other shot analytics, for generating audio instructions that describe the leader's shot. In some embodiments, speech recognition techniques may be deployed to interpret the leader's instructions. For each player who attempts at this shot, computer vision algorithms may be used to determine if the player has successfully complete the challenge. In some embodiments, handicapped users may be classified as such and be granted specific privileges to help them play with regular players.

In embodiments where users choose to play against an existing game video recording, for example by a celebrity player, the game video recording serves as that for the leader and may be annotated with metadata describing the game settings. In some embodiments, the NEX system may analyze the selected game video recording using the same computer vision techniques to derive game settings, and to determine player analytics, for generating shot instructions to participating players, and for scoring shot attempts by the players. In some embodiments, the game video recording may be that of a regular basketball game such as one from the NBA playoffs. A user may select one or more particular players in the game recording, and choose to track one or more shot types by the selected players. For example, a user may choose to track all three-point shots by Stephen Curry in his winning game against Oklahoma City Thunder in the 2015-2016 season. The NEX system may track his movements and analyze his posture flows, again for generating shot instructions to users participating in the interactive game, and for scoring users' shot attempts. In some embodiments, the analysis of existing game recordings may be performed by a NEX server, where shot instructions thus generated may be provided together with the game recording to individual players.

In some embodiments, successive rounds of play may occur until the game reaches a last round, as per pre-configured game settings, or until a pre-configured number of users remain. For example, the game may be configured to last until a single winner, or a given number of winners are determined, or until a given number of rounds have been completed.

In some embodiments, users who complete the challenge(s) may be congratulated, for example, using audio, video, and text. In some embodiments, additional congratulations may be provided if deployed artificial intelligence algorithms conclude that a user passed the challenge with exceptionally high scores. Users who do not pass the challenge(s), on the other hand, may be dropped from the game. Users who win the game may be awarded badges within the game, virtual goods, or physical goods or cash offered by NEX system or by one or more sponsors.

In some embodiments, game enhancements may be provided in several ways to promote celebrity sponsorships or to engage with users. For example, a user may be allowed to interact directly with a game leader via a two-way audio once the user survives the game until a certain round. In another example, the names of one or more users may be made available to the leader of the game for "shout outs."

As can be seen from this illustrative basketball challenge, interactive physical games as facilitated by the NEX system may be scalable. For example, a theoretically unlimited number of users may join each game. The difficulty of each challenge may determine an attrition rate so the system may predictably reduce the number of users in each round to complete the game within a reasonable timeframe. This exemplary game may be used by a celebrity sponsor such as an all-star basketball player to draw in a huge crowd, or by a coach who requires his users to participate as part of off-season training.

Other Illustrative Examples of Interactive Physical Games

Apart from the exemplary basketball challenge presented in the previous subsection, one of ordinary skill in the art would recognize that many different types of game challenges are within the scope of the present invention. Such interactive physical challenges do not have to be related to basketball, and can be devised for any existing game. Some examples of challenges include, but are not limited to:

"HOMECOURT Challenges" may serve as an introductory tutorial for an implementation of the present invention involving basketball, and may include simple tasks such as taking five free throws. One objective is to engage users right off the gate. Such challenges may not be limited to multiplayer competitions among users of the system. There may be single-player endurance challenges such as taking 10K shots that encourages practice of certain skills.

"Skill Training Challenges" may help users build up certain skills such as speed, reaction time, and agility by evaluating their performances and providing feedback. For example, a famous player may teach five key skills in real-time or through a game video recording, and user can put these skills into action in the form of challenges. An agility training game may help users improve their agility with multiple organized exercises, including but not limited to, box jumps, high knee drills, dot drills, lateral lunges, and angle lunges.

"Team Challenges" may require users to form teams to participate. Players in the same team may be located at the same gaming area or in geographically different gaming areas. For example, players from different countries, different cities, or different universities may form different teams.

"User-initiated Challenges" may enable a user to set up a challenge and invite his or her friends to participate. For example, a user can set up a remote basketball H-O-R-S-E game and serve as the leader to initiate the game.

"Sponsored Challenges" may allow a sponsor to use NEX as a platform to engage their audience in unique ways. There may be prizes tied to the challenges and NEX might be paid for hosting them.

"Dunk Contests" may be setup for a basketball game, to have users send in 5-second videos recorded with NEX. A dunk that gets the most votes wins a big prize.

"State Championships" with regional contests of chosen sports or challenges.

"Most shots made by country" where a country with the most ballers makes the most shots.

"Fund raising challenges" may help organizations such as non-profits raise funds.

"Fans challenges" allow professional or intercollegiate sports teams challenge their fan base and give free tickets away.

There are many other exemplary interactive physical challenges or games that can be played through the NEX system. These challenges may become viral, potentially with prizes and/or promotions by one or more sponsors, to maximize the draw to new users. In some embodiments, challenges may be free to join or rate limited by subscription. For example, subscribers may be allowed to participate in a given challenge for five more times when free users get only three chances.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device, as illustrated in FIG. 2, is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention

What is claimed is:

1. A method for multiplayer interactive physical gaming with at least two mobile computing devices, comprising:
   joining a multiplayer interactive physical game including at least a first player and a second player, wherein the first player and the second player participate in an activity;
   capturing a first game video of the first player in a first play of the multiplayer interactive physical game, using a first camera on a first mobile computing device in a first gaming area;
   determining a first object flow associated with the first player from the first game video, by (a) performing an algorithm on one or more frames of the first game video to detect one or more key points of the first player and to determine an affinity field map, and (b) determining a pose of the first player based on the key points and the affinity field map;
   generating a first analytic based on the first object flow;
   receiving a second analytic associated with the second player in a second gaming area; and
   generating a feedback to the first player based on at least one of the first analytic and the second analytic.

2. The method of claim 1, wherein the second gaming area is geographically different from the first gaming area.

3. The method of claim 1, wherein the first player and the second player of the multiplayer interactive physical game are playing asynchronously in time.

4. The method of claim 1, further comprising:
   receiving a user input from the first player to initiate the multiplayer interactive physical game, wherein the user input is selected from the group consisting of a voice input and a gesture input to the first mobile computing device.

5. The method of claim 1, further comprising:
   detecting a scoring attempt from the first game video of the multiplayer interactive physical game, and wherein the generating of the first analytic is based on an outcome of the scoring attempt.

6. The method of claim 1, further comprising:
providing the feedback to the first player using at least one of an audio output and a video output associated with the first mobile computing device.

7. The method of claim 1, wherein the generating of the feedback is live during the first play of the multiplayer interactive physical game.

8. The method of claim 1, wherein the feedback to the first player comprises instructions for actions to be performed by the first player.

9. The method of claim 1, further comprising:
determining a location of a portion of a body of the first player in the first gaming area from the first game video, wherein the generating of the feedback is further based on the location.

10. A system for remote multiplayer interactive physical gaming with mobile computing devices, comprising:
at least one processor on a mobile computing device; and
a non-transitory physical medium for storing program code accessible by the at least one processor, the program code when executed by the processor causes the processor to:
join a multiplayer interactive physical game including at least a first player and a second player, wherein the first player and the second player participate in an activity;
capture a first game video of the first player in a first play of the multiplayer interactive physical game, using a first camera on a first mobile computing device in a first gaming area;
determine a first object flow associated with the first player from the first game video, by (a) performing an algorithm on one or more frames of the first game video to detect one or more key points of the first player and to determine an affinity field map, and (b) determining a pose of the first player based on the key points and the affinity field map;
generate a first analytic based on the first object flow;
receive a second analytic associated with the second player in a second gaming area; and
generate a feedback to the first player based on at least one of the first analytic and the second analytic.

11. The system of claim 10, wherein the second mobile computing device is in a second gaming area that is geographically different from the first gaming area.

12. The system of claim 10, wherein the first player and the second player of the multiplayer interactive physical game are playing asynchronously in time.

13. The system of claim 10, wherein the program code when executed by the processor further causes the processor to:
receive a user input from the first player to initiate the multiplayer interactive physical game, wherein the user input is selected from the group consisting of a voice input and a gesture input to the first mobile computing device.

14. The system of claim 10, wherein the program code when executed by the processor further causes the processor to:
detect a scoring attempt from the first game video of the multiplayer interactive physical game, and wherein the program code that causes the processor to generate the first analytic is based on an outcome of the scoring attempt.

15. The system of claim 10, wherein the program code when executed by the processor further causes the processor to:
provide the feedback to the first player using at least one of an audio output and a video output associated with the first mobile computing device.

16. The system of claim 10, wherein the generating the feedback is live during the first play of the multiplayer interactive physical game.

17. The system of claim 10, wherein the feedback to the first player comprises instructions for actions to be performed by the first player.

18. A non-transitory physical storage medium for remote multiplayer interactive physical gaming with mobile computing devices, the storage medium comprising program code stored thereon, and the program code when executed by a processor causes the processor to:
join a multiplayer interactive physical game including at least a first player and a second player, wherein the first player and the second player participate in an activity;
capture a first game video of the first player in a first play of the multiplayer interactive physical game, using a first camera on a first mobile computing device in a first gaming area;
determine a first object flow associated with the first player from the first game video, by (a) performing an algorithm on one or more frames of the first game video to detect one or more key points of the first player and to determine an affinity field map, and (b) determining a pose of the first player based on the key points and the affinity field map;
generate a first analytic based on the first object flow;
receive a second analytic associated with the second player in a second gaming area; and
generate a feedback to the first player based on at least one of the first analytic and the second analytic.

* * * * *